(12) United States Patent
Komori et al.

(10) Patent No.: US 7,316,722 B2
(45) Date of Patent: Jan. 8, 2008

(54) HONEYCOMB STRUCTURE

(75) Inventors: Teruo Komori, Gifu (JP); Kazushige Ohno, Gifu (JP); Sungtae Hong, Gifu (JP); Yukio Oshimi, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 274 days.

(21) Appl. No.: 10/490,205

(22) PCT Filed: Sep. 16, 2003

(86) PCT No.: PCT/JP03/11781

§ 371 (c)(1),
(2), (4) Date: Sep. 9, 2004

(87) PCT Pub. No.: WO2004/024295

PCT Pub. Date: Mar. 25, 2004

(65) Prior Publication Data
US 2005/0016140 A1 Jan. 27, 2005

(30) Foreign Application Priority Data
Sep. 13, 2002 (JP) ............................. 2002-267819
Mar. 4, 2003 (JP) ............................. 2003-057631
Jun. 23, 2003 (JP) ............................. 2003-178712

(51) Int. Cl.
*B01D 46/00* (2006.01)
*F01N 3/023* (2006.01)

(52) U.S. Cl. .................. 55/523; 55/282.2; 55/282.3; 55/385.3; 55/482; 55/484; 55/DIG. 10; 55/DIG. 30; 60/311; 428/116

(58) Field of Classification Search ............... 55/282.2, 55/282.3, 385.3, 523, DIG. 10, DIG. 30, 55/482, 484; 60/311; 428/116, 117, 118
See application file for complete search history.

(56) References Cited

U.S. PATENT DOCUMENTS 4,276,071 A * 6/1981 Outland ...................... 55/523

(Continued)

FOREIGN PATENT DOCUMENTS

DE 100 37 403 A1 2/2002

(Continued)

OTHER PUBLICATIONS

U.S. Appl. No. 10/671,418, filed Sep. 26, 2003, Ohno et al.

(Continued)

*Primary Examiner*—Jason M. Greene
(74) *Attorney, Agent, or Firm*—Oblon, Spivak, McClelland, Maier & Neustadt, P.C.

(57) ABSTRACT

An object of the present invention is to provide a honeycomb structural body (filter) which has a low pressure loss upon collecting particulates, makes it possible to deposit a great amount of particulates and ashes, and is less likely to produce cracks. The columnar honeycomb structural body of the present invention includes a plurality of through holes placed in parallel with one another in the length direction, and wall portion that separates the plurality of through holes from one another and constitutes a circumferential face, wherein the plurality of through holes are composed of a group of large-capacity through holes, with one end thereof being sealed so as to cause the total of areas of cross-section perpendicular to the length direction to become relatively greater, and a group of small-capacity through holes, with the other end thereof being sealed so as to cause the total of areas of the above-mentioned cross-section to become relatively smaller, and the above-mentioned circumferential face of the columnar honeycomb structural body has a chamfered corner portion.

26 Claims, 16 Drawing Sheets

U.S. PATENT DOCUMENTS

| | | | |
|---|---|---|---|
| 4,364,761 A | 12/1982 | Berg et al. | |
| 4,416,676 A * | 11/1983 | Montierth | 55/523 |
| 4,417,908 A | 11/1983 | Pitcher, Jr. | |
| 4,420,316 A | 12/1983 | Frost et al. | |
| 4,643,749 A | 2/1987 | Miura | |
| 4,857,089 A | 8/1989 | Kitagawa et al. | |
| 5,545,243 A | 8/1996 | Kotani et al. | |
| 5,914,187 A | 6/1999 | Naruse et al. | |
| 5,930,994 A | 8/1999 | Shimato et al. | |
| 6,395,370 B1 | 5/2002 | Noda et al. | |
| 6,447,564 B1 | 9/2002 | Ohno et al. | |
| 6,565,630 B2 | 5/2003 | Ohno et al. | |
| 6,669,751 B1 | 12/2003 | Ohno et al. | |
| 6,696,132 B2 * | 2/2004 | Beall et al. | 55/523 |
| 6,716,512 B2 | 4/2004 | Yamamoto et al. | |
| 2002/0180117 A1 | 12/2002 | Yamamoto et al. | |
| 2002/0197193 A1 * | 12/2002 | Harada et al. | 55/523 |
| 2003/0019354 A1 | 1/2003 | Kojima | |
| 2003/0041730 A1 | 3/2003 | Beall et al. | |
| 2003/0167755 A1 | 9/2003 | Nakatani et al. | |
| 2004/0031264 A1 | 2/2004 | Kojima | |
| 2004/0033175 A1 | 2/2004 | Ohno et al. | |
| 2004/0055265 A1 | 3/2004 | Ohno et al. | |
| 2004/0097370 A1 | 5/2004 | Ichikawa et al. | |
| 2004/0223892 A1 | 11/2004 | Kojima | |
| 2005/0016140 A1 | 1/2005 | Komori et al | |
| 2005/0159310 A1 | 7/2005 | Ohno et al. | |
| 2005/0176581 A1 | 8/2005 | Ohno et al. | |
| 2005/0214504 A1 | 9/2005 | Yoshida | |
| 2005/0229565 A1 | 10/2005 | Yoshida | |
| 2005/0247038 A1 | 11/2005 | Takahashi | |
| 2005/0272602 A1 | 12/2005 | Ninomiya | |
| 2006/0019061 A1 | 1/2006 | Oshimi | |
| 2006/0029897 A1 | 2/2006 | Saijo et al. | |
| 2006/0029898 A1 | 2/2006 | Saijo et al. | |
| 2006/0043652 A1 | 3/2006 | Saijo et al. | |
| 2006/0059877 A1 | 3/2006 | Yoshida | |

FOREIGN PATENT DOCUMENTS

| | | |
|---|---|---|
| EP | 0 089 751 | 9/1983 |
| EP | 0 277 012 A1 | 8/1988 |
| EP | 0 658 363 A1 | 6/1995 |
| EP | 1 142 619 | 10/2001 |
| EP | 1 170 270 A1 | 1/2002 |
| EP | 1 174 399 A1 | 1/2002 |
| EP | 1 447 535 A1 | 8/2004 |
| FR | 2 789 327 | 8/2000 |
| FR | 2 840 545 | 12/2003 |
| JP | 56-124417 | 9/1981 |
| JP | 56-124418 | 9/1981 |
| JP | 58-92409 | 6/1983 |
| JP | 58-150015 | 9/1983 |
| JP | 58-196820 | 11/1983 |
| JP | 61-424 | 1/1986 |
| JP | 62-96717 | 5/1987 |
| JP | 63-185425 | 8/1988 |
| JP | 3-49608 | 7/1991 |
| JP | 3-102016 | 10/1991 |
| JP | 5-68828 | 3/1993 |
| JP | 6-47620 | 6/1994 |
| JP | 7-163823 | 6/1995 |
| JP | 3130587 | 11/2000 |
| JP | 2001-96117 | 4/2001 |
| JP | 2001-162121 | 6/2001 |
| JP | 2001-199777 | 7/2001 |
| JP | 2001-206780 | 7/2001 |
| JP | 2001-334114 | * 12/2001 |
| JP | 2003-1029 | 1/2003 |
| JP | 2003-49627 | 2/2003 |
| JP | 2003-155908 | 5/2003 |
| JP | 2004-896 | 1/2004 |
| WO | WO 01/23069 A1 | 4/2001 |
| WO | WO 01/53232 A1 | 7/2001 |
| WO | 02/10562 | 2/2002 |
| WO | WO 02/100514 A1 | 12/2002 |
| WO | WO 03/014539 A1 | 2/2003 |
| WO | 03/20407 | 3/2003 |
| WO | WO 03/044338 A1 | 5/2003 |
| WO | 03/80218 | 10/2003 |

OTHER PUBLICATIONS

U.S. Appl. No. 10/220,283, filed Mar. 14, 2001, Kojima.
U.S. Appl. No. 10/362,975, filed Oct. 1, 2001, Ohno et al.
U.S. Appl. No. 10/296,027, filed Mar. 20, 2002, Kojima.
U.S. Appl. No. 09/926,795.
U.S. Appl. No. 10/129,126.
U.S. Appl. No. 10/477,741.
U.S. Appl. No. 10/490,206, filed Mar. 29, 2004, Hong et al.
U.S. Appl. No. 10/490,205, filed Mar. 29, 2004, Komori et al.
U.S. Appl. No. 10/493,056, filed Apr. 29, 2004, Hong et al.
U.S. Appl. No. 10/490,205, filed Sep. 9, 2004, Komori et al.
U.S. Appl. No. 10/502,054, filed Jul. 30, 2004, Kudo et al.
U.S. Appl. No. 10/506,438, filed Sep. 2, 2004, Taoka et al.
U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 18, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 10/521,592, filed Jan. 18, 2005, Ohno et al.
U.S. Appl. No. 11/225,197.
U.S. Appl. No. 10/518,548, filed Jan. 3, 2005, Takahashi.
U.S. Appl. No. 10/527,531, filed Mar. 11, 2005, Ogyu et al.
U.S. Appl. No. 10/530,561, filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.

* cited by examiner (a)

(b)

Cross-sectional view taken along line A-A

- ◆ Number of inlet-side through holes 4
- ■ Number of inlet-side through holes 2
- ▲ Number of inlet-side through holes 0

HONEYCOMB STRUCTURE

CROSS REFERENCE TO RELATED APPLICATION

This application claims benefit of priority to Japanese Patent application Nos. 2002-267819filed on Sep. 13, 2002, 2003-57631 filed on Mar. 4, 2003, and 2003-178712 filed on Jun. 23, 2003, the contents of which are incorporated by reference herein.

TECHNICAL FIELD

The present invention relates to a honeycomb structural body used as a filter or the like for removing particulates and the like contained in exhaust gases discharged from an internal combustion engine such as a diesel engine and the like.

BACKGROUND ART

In recent years, particulates such as soot, contained in exhaust gases that are discharged from internal combustion engines of vehicles such as buses and trucks and construction equipment, have raised serious problems as contaminants harmful to the environment and the human body.

For this reason, various honeycomb structural bodies, made from porous ceramics, have been proposed as filters capable of collecting particulates from exhaust gases to purify the exhaust gases.

Conventionally, with respect to the honeycomb structural bodies of this type, filters have been proposed (for example, see Japanese Patent gazette No. 3130587and FIG. 17 of U.S. Pat. No. 4,4179,08) in which through holes of two kinds, that is, a through hole with a larger capacity (hereinafter, also referred to as large-capacity through hole) and a through hole with a smaller capacity (hereinafter, also referred to as small-capacity through hole) are formed, and the end of the large-capacity through hole on the exhaust gas outlet side is sealed with a sealing material with the end of the small-capacity through hole on the exhaust gas inlet side being sealed with a sealing member, so that the surface area of a through hole with the opened inlet side (hereinafter, also referred to as inlet-side through hole) is made relatively larger than the surface area of a through hole with the opened outlet side (hereinafter, also referred to as outlet-side through hole) thus, the filters make it possible to increase the collection amount of particulates, to lengthen the period up to the recovery process and also to achieve a small-sized device.

Moreover, filters have been disclosed (for example, see FIG. 3 of U.S. Pat. No. 4,417,908) in which the number of inlet-side through holes is made greater than the number of outlet-side through holes, with the surface area of the inlet-side through holes being also made relatively greater than the surface area of the outlet-side through holes; thus, the filters make it possible to increase the collection amount of particulates, to lengthen the period up to the recovery process and also to achieve a small-sized device.

In other words, in the honeycomb structural bodies to be used as exhaust gas purifying filters that are disclosed in Japanese Patent gazette No. 3130587 as well as in U.S. Pat. No. 4,4179,08, in comparison with a honeycomb structural body with the total surface area of the inlet-side through holes being set to the same as the total surface area of the outlet-side through holes, the total surface area of the inlet-side through holes is made relatively greater so that it becomes possible to make the thickness of a deposition layer for collected particulates thinner; consequently, it becomes possible to increase the limiting collection amount of particulates as described above.

Additionally, such conventional techniques include those described in the following patent literatures.

J P Kokai Sho 56-124418 has disclosed a ceramic filter in which throughholes having shapes, such as a triangle, a hexagonal shape, a round shape and a convex shape, are formed. Moreover, U.S. Pat. No. 4,276,071 (FIGS. 5a to 5p), J P KokaiSho56-124417, JP Kokai Sho 62-96717 and U.S. Pat. No. 4,364,761 (FIGS. 5a to 5p) have disclosed arrangements similar to that of J P Kokai Sho 56-124418.

Microfilms of Japanese Utility Model Application No. 56-187890 (J UM KokaiSho58-92409 (FIG. 6, page 4) have disclosed an exhaust gas filter in which triangular through holes and hexagonal through holes are formed with cell pitches of large-capacity through holes being set approximately in a range from 1.0 to 2.5 mm.

U.S. Pat. No. 4,416,676 (FIGS. 1 to 4) has disclosed a honeycomb filter in which through holes having shapes, such as a triangle, a square, an octagonal shape and a round shape, are formed with the relationship between the wall thickness between large-capacity through holes and the wall thickness between the large-capacity through hole and the small-capacity through hole is defined.

J P Kokai Sho 58-196820, J P Kokoku Hei 3-49608 and U.S. Pat. No. 4,417,908 (FIGS. 3 to 17) have disclosed honeycomb filters in which through holes having shapes such as a triangle, a square and a hexagonal shape as well as honeycomb filters in which the number of through holes on the inlet side is made greater than the number of through holes on the outlet side so that the aperture rate on the exhaust gas inlet side is made relatively greater than the aperture rate on the exhaust gas outlet side.

U.S. Pat. No. 4,420,316 (FIGS. 6 to 9) has disclosed a honeycomb filter in which the number of sealed through holes is modified, which relates to a technique for improving the gas flow rate in the wall portion.

J Kokai Sho 58-150015 has disclosed a filter which is provided with square through holes and rectangular through holes, with the cross-sectional shape of the through holes being formed into a tapered shape so as to be changed from the gas inlet side toward the outlet side.

J P Kokai Hei 5-68828 and Japanese Patent gazette No. 3130587 (page 1) have disclosed honeycomb filters in which triangular through holes and hexagonal through holes are formed and the capacity rate of the large-capacity through holes is set to 60 to 70% while the capacity rate of the small-capacity through holes is set to 20 to 30%, with the cell pitch of the large-capacity through holes being set to approximately in a range from 2.5 to 5.0 mm.

French Patent No. 2789327 has disclosed a filter that is provided with through holes having shapes such as a rectangular shape, a square shape, a hexagonal shape and an octagonal shape, with the cross-sectional shape of the through holes being formed into a tapered shape so as to be changed from the gas inlet side toward the outlet side.

International Publication No. 02/100514 and J P Kokai 2001-334114 (FIG. 2) have disclosed filters in which through holes having a round shape and a hexagonal shape are formed. These have also disclosed filter elements in which the ratio of the total area of the cross-section of small-capacity through holes to the total area of the cross-section of large-capacity through holes is set in a range from 40 to 120%.

International Publication No. 02/10562 has disclosed a filter in which square through holes and hexagonal through holes are formed, with the ratio of cross-sections thereof being set in a range from 3:1 to 4:1.

International Publication No. 03/20407 has disclosed a honeycomb structural body in which square through holes are formed with a varied ratio of cross-sectional areas.

Moreover, in addition to the above-mentioned honeycomb structural bodies each of which is formed into an integral structure as a whole (hereinafter, also referred to as integrated filter), J P Kokai 2001-162121 has disclosed a honeycomb structural body in which a plurality of columnar ceramic members are combined with one another through seal material layers (hereinafter, referred to as aggregate-type filter).

However, in the case where the integrated filter is formed into a column shape, cracks tend to occur at corner portions (four corners) due to a thermal stress imposed thereon upon burning particulates. In the same manner, at corner portions (four corners) of columnar ceramic members forming an aggregate-type filter, cracks also tend to occur due to a thermal stress imposed thereon upon burning particulates. Moreover, in the case where cells that have openings on the outlet side are located at corner portions (four corners), with throughholes having different capacities being formed, as disclosed in U.S. Pat. No. 4,417,908, the occurrence of cracks becomes more conspicuous.

SUMMARY OF THE INVENTION

The present invention has been devised so as to solve the above-mentioned problems, and its object is to provide a honeycomb structural body (filter) which has a low pressure loss upon collecting particulates, makes it possible to deposit a great amount of particulates and ashes, and is less likely to generate cracks.

In order to achieve the above-mentioned object, the present inventors have studied hard, and consequently found that, in the case of through holes located at corner portions (four corners) of each of columnar ceramic members of an aggregate-type filter, since the number of adjacent through holes is smaller in comparison with those through holes located at the other portions, the flow rate of exhaust gas flowing though the holes becomes lower, and that for this reason, at the above-mentioned corner portions (four corners), there is a delay in a temperature rise upon burning particulates to cause a concentrated thermal stress and the subsequent cracks; thus, the present invention has been completed.

In other words, the columnar honeycomb structural body of the present invention includes a plurality of through holes placed in parallel with one another in the length direction; and wall portion that separates the plurality of through holes from one another and constitutes circumferential face, wherein the above-mentioned plurality of throughholes comprises: a group of large-capacity through holes, with one end thereof being sealed so as to cause the total of areas of cross-section perpendicular to the length direction to become relatively greater; and a group of small-capacity through holes, with the other end thereof being sealed so as to cause the total of areas of the above-mentioned cross-section to become relatively smaller, the above-mentioned circumferential face of the above-mentioned columnar honeycomb structural body having a chamfered corner portion.

Since the honeycomb structural body of the present invention has chamfered faces at corner portions of the circumferential face, it becomes possible to alleviate a thermal stress imposed on the corner portions that are structurally more susceptible to the thermal stress, and consequently to reduce occurrence of cracks, when the honeycomb structural body is used as an exhaust gas purifying filter.

The honeycomb structural body of the present invention includes through holes composed of a group of large-capacity through holes and a group of small-capacity through holes so that by using the group of large-capacity through holes as inlet side through holes, it becomes possible to make the total amount of the surface areas of the inlet-side through holes relatively greater. Thus, in comparison with a honeycomb structural body in which the total amount of the surface areas of the inlet-side through holes is the same as the total amount of the surface areas of the outlet-side through holes, it becomes possible to make the thickness of a deposition layer of particulates thinner; therefore, it becomes possible to suppress an increased pressure loss upon collecting particulates and also to increase the limiting collection amount of particulates. Moreover, in the case where, after having collected a fixed amount of particulates, particulates are made in contact with high temperature gases to be burned, by controlling the engine to increase the exhaust gas temperature or by increasing the temperature of a heater placed on the upstream side of exhaust gases from the honeycomb structural body, since the burning process is carried out more easily as the thickness of the deposition layer of particulates becomes thinner, it is possible to increase the burning rate of particulates.

Moreover, by adopting the group of large-capacity through holes as inlet-side through holes, it is also possible to relatively increase the total amount of the capacities of the inlet-side through holes, and consequently to deposit a greater amount of residual ashes after the burning process of particulates; therefore, it becomes possible to lengthen the service life of the filter. As a result, it becomes possible to greatly reduce maintenance costs required for backwash, exchanges and the like.

Additionally, with respect to the combination between the above-mentioned group of large-capacity through holes and group of small-capacity through holes, the following combinations are listed: (1) a case where, with respect to each of through holes constituting the group of the large-capacity through holes and each of through holes constituting the group of the small-capacity through holes, the areas of cross sections perpendicular to the length direction are the same, while the number of the through holes constituting the group of large-capacity through holes is greater; (2) a case where, with respect to each of through holes constituting the group of the large-capacity through holes and each of through holes constituting the group of the small-capacity through holes, the areas of cross sections thereof are different from each other, with the numbers of the respective through holes being different from each other; and (3) a case where, with respect to each of through holes constituting the group of the large-capacity through holes and each of through holes constituting the group of the small-capacity throughholes, the area of the cross section of the through holes constituting the group of large-capacity through holes is greater, with the numbers of the through holes of the two groups being the same.

Moreover, with respect to the through holes constituting the group of the large-capacity through holes and/or the through holes constituting the group of the small-capacity throughholes, those through holes may be formed by using the through holes of one type having the same shape and the same area of cross sections perpendicular to the length direction, or may be formed by using the through holes of two or more types having different shapes and different areas of cross sections perpendicular to the length direction.

It is desirable that the columnar honeycomb structural body of the present invention includes a plurality of through holes placed in parallel with one another in the length direction; and wall portion that separates the plurality of through holes from one another and constitutes circumferential face, wherein the above-mentioned plurality of throughholes comprises: a group of large-capacity through holes, with one end thereof being sealed so as to cause the total of areas of cross-section perpendicular to the length direction to become relatively greater; and a group of small-capacity through holes, with the other end thereof being sealed so as to cause the total of areas of the above-mentioned cross-section to become relatively smaller, the above-mentioned circumferential face of the above-mentioned columnar honeycomb structural body having corner portions, and each part of the above-mentioned wall portion constituting the above-mentioned corner portion having a R-chamfered face and/or a C-chamfered face on the inside and/or outside thereof.

Here, in the present specification, the R-chamfered face refers to a chamfered face prepared by forming the corner portion into a circular arc shape. Further, the C-chamfered face refers to a chambered face without any acute angles or right angles on the corner portion, formed by increasing the number of sides constituting the corner portion.

In the honeycomb structural body of the present invention, since each part of the above-mentioned wall portion constituting the above-mentioned corner portion has a R-chamfered face and/or a C-chamfered face on the inside (the side forming a wall face of a through hole positioned at a corner portion) and/or outside thereof (the side forming a circumferential face of the honeycomb structural body of the present invention), it is possible to alleviate a thermal stress exerted on the corner portion that is structurally susceptible to thermal stress concentration, when used as an exhaust gas purifying filter, and consequently to suppress the occurrence of cracks. Moreover, in the case where an R-chamfered face and/or a C-chamfered face is formed on the inside of a part of wall portion constituting the corner portion, it is possible to improve the fluidity of gases in the through hole located at the corner portion that structurally makes it difficult for gases to pass through, and consequently to reduce a temperature different from the other through holes upon burning particulates; therefore, it becomes possible to effectively reduce the occurrence of cracks.

In the honeycomb structural body of the present invention, at least half or more of the number of through holes located at corner portions of the circumferential face are desirably the through holes constituting the group of large-capacity through holes.

In the case where the honeycomb structural body of the present invention is used as an exhaust gas purifying filter, the outlet-side through holes are less susceptible to deposition of particulates, and with respect to those through holes located at corner portions, the number of adjacent throughholes is small, and this structurally makes it difficult for exhaust gases to pass through; therefore, when the outlet-side through holes are located at the corner portions, there is a delay for a temperature rise upon burning particulates in comparison with the other portions to cause a thermal stress concentration and the subsequent occurrence of cracks at the corner portions. Therefore, at least half or more of the number of through holes located at corner portions are formed as those inlet-side through holes constituting the group of large-capacity through holes so that, upon burning particulates, the burning of particulates is allowed to take place even in those through holes located at the corner portions; thus, it becomes possible to reduce local temperature deviations in the honeycomb structural body of the present invention to a minimum level, and consequently to suppress the occurrence of cracks.

Here, depending on layout patterns of the through holes in the honeycomb structural body of the present invention, in some cases, an arrangement in which through holes located at corner portions are formed as those through holes constituting the group of large-capacity through holes makes it possible to increase the aperture rate of the honeycomb structural body of the present invention, and consequently to reduce pressure losses.

Additionally, it is desirable to form all the through holes located at corner portions of the circumferential face as the through holes constituting the group of large-capacity through holes.

In the honeycomb structural body of the present invention, the shape of cross-sections perpendicular to the length direction of: the through holes constituting the group of large-capacity through holes; and/or the through holes constituting the group of small-capacity through holes is desirably a polygonal shape.

In the case where the honeycomb structural body of the present invention is used as an exhaust gas purifying filter, by realizing the arrangement wherein the shape of cross-sections perpendicular to the length direction of those through holes is formed into a polygonal shape, it becomes possible to reduce the area of the wall portion in the cross section, and consequently to reduce resistance to be exerted when exhaust gases pass through the wall portion, and a main portion of frictional resistance derived from the cross-sectional shape of the through holes is eliminated so that it becomes possible to reduce resistance exerted when exhaust gases pass through the through holes, and consequently to reduce pressure losses more effectively.

In the honeycomb structural body of the present invention, it is desirable that, on a cross-section perpendicular to the length direction, at least one angle formed at the point where a wall portion, shared by a through hole constituting a group of large-capacity through holes and an adjacent through hole constituting a group of large-capacity through holes, is caused to intersect a wall portion, shared by a throughhole constituting a group of the large-capacity through holes and an adjacent through hole constituting a group of the small-capacity through holes, is an obtuse angle; thus, in the case where the honeycomb structural body of the present invention is used as an exhaust gas purifying filter, it becomes possible to reduce pressure losses more effectively.

In the honeycomb structural body of the present invention, it is desirable that, of the through holes constituting the group of large-capacity through holes and the through holes constituting the group of small-capacity through holes, the through holes of one type are formed into an octagonal shape in the cross-section perpendicular to the length direction thereof, with the through holes of the other type being formed into a quadrangle or square shape in the cross-section thereof; thus, when the honeycomb structural body of the present invention is used as an exhaust gas purifying filter, it becomes possible to reduce pressure losses more effectively.

In the honeycomb structural body of the present invention, it is desirable that a cross-section perpendicular to the length direction of the through holes constituting the group of large-capacity through holes and/or the through holes constituting the group of small-capacity through holes is provided with a curved shape in the vicinity of the corners thereof.

In the case where the honeycomb structural body of the present invention is used as an exhaust gas purifying filter, since the through holes have cross-sections perpendicular to the length direction, each of which has a curved shape in the vicinity of each of the corners, it becomes possible to effectively reduce pressure losses due to friction exerted upon passage of gases through the through holes, and also to prevent the generation of cracks caused by concentrated stress at corner portions on the cross-section perpendicular to the length direction of the through holes.

In the honeycomb structural body of the present invention, it is desirable that a distance between centers of gravity of cross-sections perpendicular to the length direction of the adjacent through holes constituting the group of large-capacity through holes is set to the same as a distance between centers of gravity of cross-sections perpendicular to the length direction of the adjacent through holes constituting the group of small-capacity through holes.

Here, in the present specification, the expression, "the distance between centers of gravity of cross-sections perpendicular to the length direction of the adjacent through holes constituting the group of large-capacity through holes" refers to a minimum distance between the center of gravity of a cross-section perpendicular to the length direction of a through hole forming one member of the group of large-capacity through holes and the center of gravity of a cross-section perpendicular to the length direction of a through hole forming the adjacent through hole forming one member of the group of large-capacity through holes, and, on the other hand, "the distance between centers of gravity of cross-sections perpendicular to the length direction of the adjacent through holes constituting the group of small-capacity through holes" refers to a minimum distance between the center of gravity of a cross-section perpendicular to the length direction of a through hole forming one member of the group of small-capacity through holes and the center of gravity of a cross-section perpendicular to the length direction of a through hole forming the adjacent through hole forming one member of the group of small-capacity through holes.

In the case where the honeycomb structural body of the present invention is used as an exhaust gas purifying filter, since the above-mentioned two center-of-gravity distances are equal to each other, heat is evenly dispersed upon recovery so that local deviations in temperature in the honeycomb structural body of the present invention are eliminated; thus, it becomes possible to reduce the occurrence of cracks due to thermal stress even after repetitive uses for a long period, and consequently to improve the durability.

Moreover, another aspect of the present invention relates to a honeycomb structural body (hereinafter, also referred to as aggregate-type honeycomb structural body of the present invention) in which: a plurality of the above-mentioned honeycomb structural bodies of the present invention (hereinafter, also referred to as integrated-type honeycomb structural body of the present invention) are combined with one another through sealing material layers to form a honeycomb block, and sealing material layers are formed on the circumferential face thereof in the length direction.

In the following description, when it is not necessary to particularly discriminate the integrated honeycomb structural body of the present invention and the aggregate-type honeycomb structural body of the present invention, these are referred to as the honeycomb structural body of the present invention.

Since the aggregate-type honeycomb structural body of the present invention is formed by combining a plurality of the integrated honeycomb structural bodies of the present invention together through sealing material layers, it is possible to alleviate the thermal stress through the sealing material layers so that the heat resistance and impact resistance are improved. For this reason, even when applied as a large-size exhaust gas purifying filter, it can sufficiently reduce the occurrence of cracks.

The honeycomb structural body of the present invention is desirably used as a filter for an exhaust gas purifying filter for use in vehicles. The honeycomb structural body of the present invention makes it possible to reduce a pressure loss upon collecting particulates, to deposit a great amount of particulates and ashes, and also to reduce the occurrence of cracks; therefore, it is desirably applied to an exhaust gas purifying apparatus for use in vehicles as an exhaust gas purifying filter.

Figure 1:
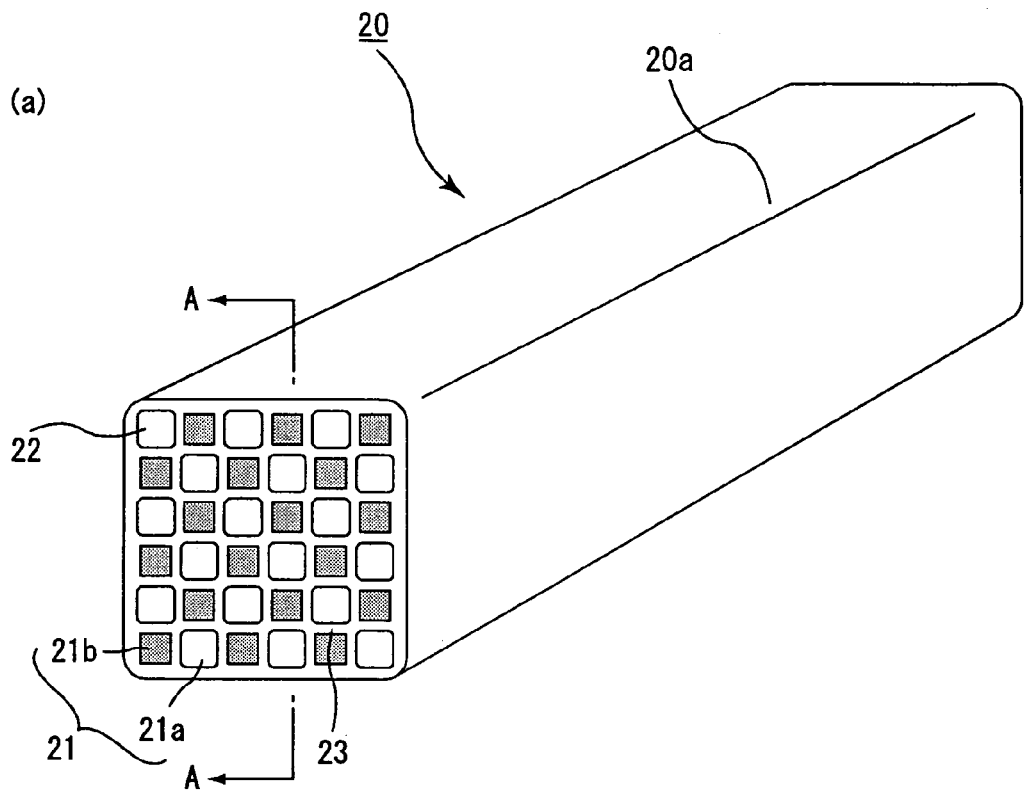
FIG. 1(a) is a perspective view that schematically shows one example of an integrated honeycomb structural body of the present invention.
FIG. 1(b) is a cross-sectional view taken along line A-A of the integrated honeycomb structural body of the present invention shown in FIG. 1(a).
Figure 1:
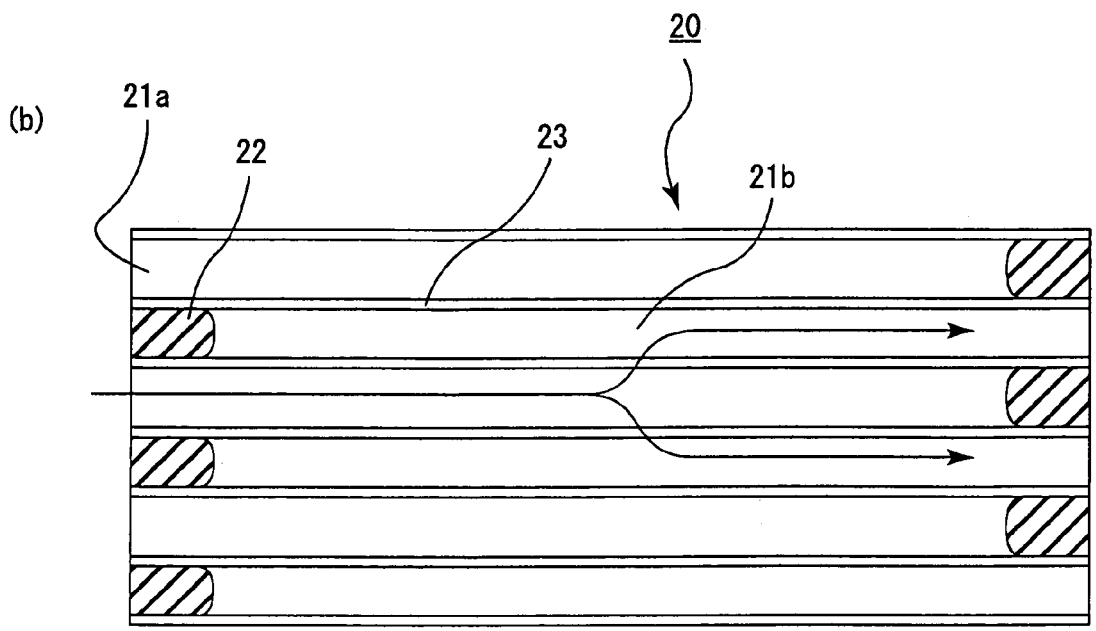

EXPLANATION OF SYMBOLS 10 aggregate-type honeycomb structural body
13 sealing material layer
14 sealing material layer
15 ceramic block
20, 100 integrated honeycomb structural body
20a corner portion
21 through hole
21a group of large-capacity through holes
21b group of small-capacity through holes
22 sealing material
23 wall portion

DETAILED DISCLOSURE OF THE INVENTION

An integrated honeycomb structural body of the present invention is a columnar honeycomb structural body which includes a plurality of through holes placed in parallel with one another in the length direction; and wall portion that separates the plurality of through holes from one another and constitutes a circumferential face, wherein the above-mentioned plurality of throughholes comprises: a group of large-capacity throughholes, with one end thereof being sealed so as to cause the total of areas of cross-section perpendicular to the length direction to become relatively greater; and a group of small-capacity through holes, with the other end thereof being sealed so as to cause the total of areas of the above-mentioned cross-section to become relatively smaller, the above-mentioned circumferential face of the above-mentioned columnar honeycomb structural body having a chamfered corner portion.

FIG. 1(a) is a perspective view that schematically shows one example of an integrated honeycomb structural body of the present invention, and FIG. 1(b) is a cross-sectional view taken along line A-A of the integrated honeycomb structural body of the present invention shown in FIG. 1(a).

As shown in FIG. 1, the integrated honeycomb structural body 20 has approximately a square column shape, and a number of through holes 21 are placed in parallel with one another in the length direction, and these through holes 21 are constituted by two kinds of through holes, that is, a group of large-capacity through holes 21a, with an end thereof on the outlet side of the integrated honeycomb structural body 20 being sealed by a sealing material 22, and a group of small-capacity through holes 21b, with an end thereof on the inlet side of the integrated honeycomb structural body 20 being sealed by the sealing material 22, and with respect to the group of large-capacity through holes 21a, the total of areas of the cross-section perpendicular to the length direction is made relatively greater in comparison with the group of small-capacity through holes 21b so that wall portion 23 separating these throughholes 21 function as a filter. In other words, exhaust gases that have been allowed to flow into the large-capacity through holes 21a are discharged from the group of small-capacity throughholes 21b after having always passed through the wall portion 23.

The circumferential face of the integrated honeycomb structural body 20 has corner portions 20a with chamfered faces. With this arrangement, when used as an exhaust gas purifying filter, the integrated honeycomb structural body 20 makes it possible to alleviate a thermal stress imposed on a corner portion that is structurally susceptible to a concentration of thermal stress.

The following description will discuss the reason why the corner portion is susceptible to a concentration of thermal stress.

Figure 20:
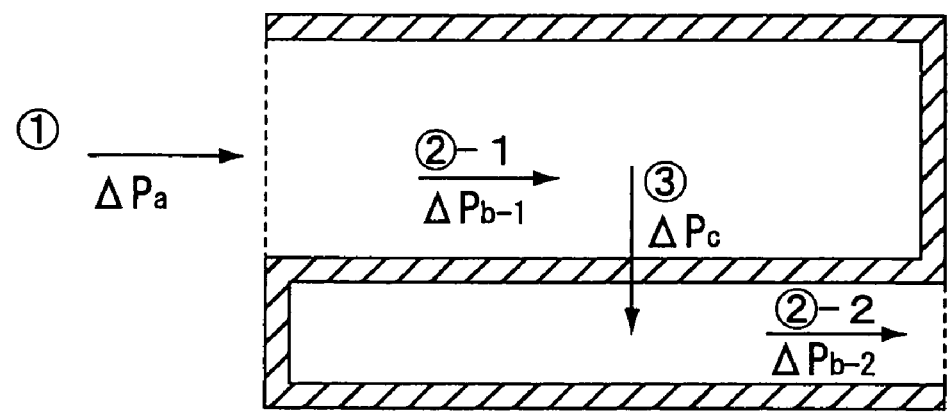
FIG. 20 is a conceptual diagram that shows main factors that cause a pressure loss in the honeycomb structural body.

FIG. 20 is a conceptual diagram that explains main factors that cause a pressure loss in the honeycomb structural body.

As shown in FIG. 20, the main factors that cause a pressure loss in the honeycomb structural body are: (1) an aperture rate on the inlet side: $\Delta Pa$, (2) friction upon passage through through holes ((2)-1 inlet side through hole: $\Delta Pb\text{-}1$, (2)-2 outlet side through hole: $\Delta Pb\text{-}2$), and (3) resistance upon passage through wall portion: $\Delta Pc$.

As described above, the integrated honeycomb structural body of the present invention is provided with a group of large-capacity through holes and a group of small-capacity through holes. For this reason, between the inlet-side through holes and the outlet-side through holes, the totals of areas of cross-sections perpendicular to the length direction are different from each other so that, in comparison with a honeycomb structural body in which the capacities of all the through holes are approximately equal, in a state prior to a collection of particulates, a pressure loss derived from the aperture rate on the inlet side and friction exerted upon passage through inlet-side through holes ((①: ΔPa+②-1: ΔPb-1) can be reduced. In contrast, friction exerted upon passage through outlet-side through holes (②-2: ΔPb -2) is increased. Moreover, since wall portion which separates the inlet-side through hole and the outlet-side through hole becomes smaller, resistance (③: ΔPc) exerted upon passage through the wall portion is increased. Consequently, in comparison with a flow rate of exhaust gases in the inlet-side through holes, the flow rate of exhaust gases in the outlet-side through holes becomes extremely slower.

Moreover, with respect to through holes located at a corner portion, since there are only two adjacent through holes, the flow rate of exhaust gases flowing through the holes becomes smaller in comparison with other through holes.

Therefore, in particular, in the case where the through holes located at a corner portion are outlet-side through holes, a temperature difference from the other through holes tends to occur upon burning particulates or the like due to the small flow rate of exhaust gases, resulting in a concentration of thermal stress in the corner portion. Moreover, the corner portion without a chamfered face is more susceptible to a thermal stress also due to its shape.

In contrast, since the integrated honeycomb structural body 20 has a chamfered face on each of its corner portions on the circumferential face. Therefore, it is possible to alleviate the thermal stress exerted on the corner portion, and consequently to suppress the occurrence of cracks; thus, it becomes possible to improve the recovery limit value of the integrated honeycomb structural body 20.

The integrated honeycomb structural body 20 is desirably designed so that a part of the wall portion 23 constituting the corner portion 20a of the circumferential face is desirably provided with a R-chamfered face and/or a C-chamfered face on the inside and/or outside thereof. With this arrangement, as described earlier, when used as an exhaust gas purifying filter, the integrated honeycomb structural body 20 makes it possible to alleviate a thermal stress imposed on a corner portion that is structurally susceptible to a concentration of thermal stress, and consequently to reduce the occurrence of cracks.

Moreover, the outermost corner portion (corner portion 20a side) in the through hole 21 located at the corner portion 20a originally makes it difficult for exhaust gases to pass through; however, by chamfering faces inside the part of the wall portion 23 constituting the corner portion 20a, it is possible to improve the fluidity of exhaust gases inside the through hole 21 located at the corner portion 20a, and also to reduce a temperature difference from the other through holes upon burning particulates or the like; thus, it becomes possible to alleviate the generation of a thermal stress.

Each of the R-dimension of the R-chamfered face and the C-dimension of the C-chamfered face is desirably set to 0.3 mm or more. The dimension of less than 0.3 mm tends to fail to sufficiently suppress concentration of a thermal stress on the above-mentioned corner portion or fail to sufficiently improve the fluidity of gases in the through hole located at the above-mentioned corner portion, with the result that, when used as an exhaust gas purifying filter, the integrated honeycomb structural body 20 tends to fail to sufficiently alleviate the thermal stress at the corner portion 20a to sufficiently suppress the generation of cracks. Preferably, the lower limit value is set to 0.5 mm, and the upper limit value is desirably set to 5 mm. The value exceeding 5 mm makes the roundness of the corner portion 20a too large to cause a recessed portion with an acute angle in the through hole located at the corner portion 20a, with the result that cracks are more apt to occur on the contrary.

Here, in the present specification, the R-dimension refers to the radius of the arc in the R-chamfered face prepared by forming the corner portion into an arc shape. Further, with respect to two sides originally constituting the corner portion, the C-dimension relates to the side that is cut with a longer length by the C-chamfered face, and refers to the cut length of the side.

Figure 5:
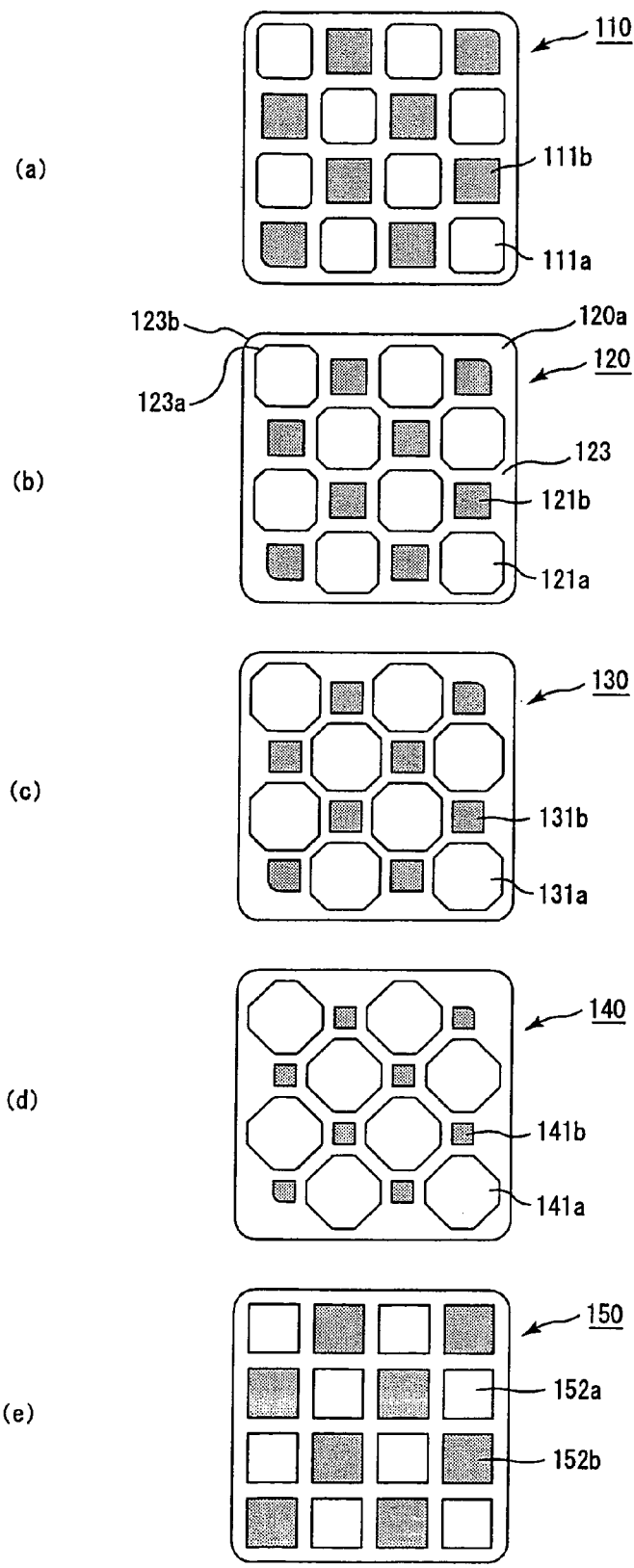
FIGS. 5(a) to 5(d) are cross-sectional views each of which schematically shows an example of a part of a cross-section perpendicular to the length direction of the integrated honeycomb structural body of the present invention.
FIG. 5(e) is a cross-sectional view that schematically shows a part of a cross section perpendicular to the length direction in a conventional integrated honeycomb structural body.
Figure 6:
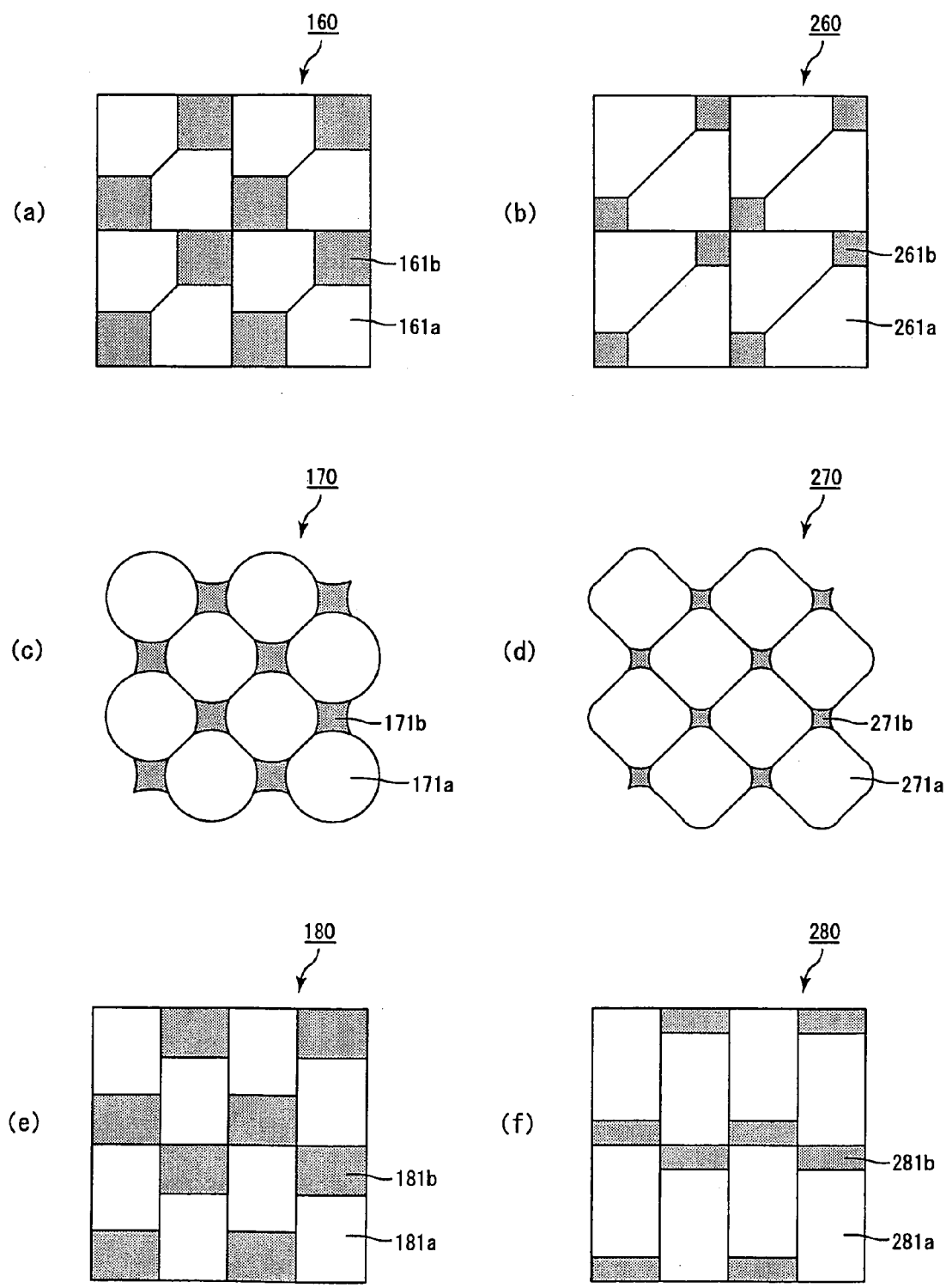
FIGS. 6(a) to 6(f) are cross-sectional views each of which schematically shows an example of a part of a cross section perpendicular to the length direction of the integrated honeycomb structural body of the present invention.

For example, in an integrated honeycomb structural body 120 shown in FIG. 5(b), specific examples of the R-chamfered face and the C-chamfered face include: an R-chamfered face formed on each of inner portions 123a of a part of wall portion 123 constituting corner portion 120a on the circumferential face; R-chamfered faces formed on each small-capacity through hole 121b; C-chamfered faces formed on each large-capacity through hole 121a; and an R-chamfered face formed on each of outer portions 123b of the wall portion 123.

Moreover, upon recovering an exhaust gas purifying filter, after particulates have been burned, the particulates contain metals and the like that are burned to form oxides in addition to carbon and the like that are burned to be eliminated, and these remain in the exhaust gas purifying filter as ashes. Since the ashes remain at portions closer to the outlet of the exhaust gas purifying filter, the through holes constituting the exhaust gas purifying filter are gradually filled with ashes from portions closer to the outlet, with the result that the volume of the portion filled with the ashes becomes gradually greater, while the volume (area) of the portions functioning as the exhaust gas purifying filter becomes gradually smaller. Further, when the accumulated amount of ashes becomes too large, this filter no longer serves as a filter; therefore, it is taken out from an exhaust pipe so that the filter is subjected to back wash to remove ashes from the exhaust gas purifying filter, or the exhaust gas purifying filter is disposed.

In comparison with a conventional honeycomb structural body in which the capacity of the through holes on the inlet side is the same as the capacity of the through holes on the outlet side, the honeycomb structural body of the present invention uses a group of large-capacity through holes as through holes on the inlet side so that, even when ashes have been accumulated, the capacity of the portions functioning as the exhaust gas purifying filter has a smaller decreasing rate, making it possible to reduce a pressure loss caused by ashes. Consequently, it is possible to lengthen the period of time until the filter requires back wash, and consequently to lengthen the service life of the exhaust gas purifying filter.

The integrated honeycomb structural body 20 shown in FIG. 1 has a approximately square-column shape; however, not particularly limited as long as it has a cross-sectional shape with at least one corner portion, examples thereof include: a column shape with a polygonal shape in its cross-section and a column shape with an arc shape in its cross-section, and the size thereof may be optionally determined. Moreover, the integrated honeycomb structural body 20 may have a column shape with an irregular cross-sectional shape, that is, for example, a tapered shape; however, the column shape is desirably designed to have a fixed cross-sectional shape.

The integrated honeycomb structural body 20 is desirably made from porous ceramics, and examples of such materials include: nitride ceramics such as aluminum nitride, silicon nitride, boron nitride and titanium nitride, carbide ceramics such as silicon carbide, zirconium carbide, titanium carbide, tantalum carbide and tungsten carbide, and oxide ceramics such as alumina, zirconia, cordierite and mullite. Moreover, the integrated honeycomb structural body 20 may be made from two kinds or more materials, such as a composite material of silicon and silica carbide, and aluminum titanate.

Although not particularly limited, the porosity of the integrated honeycomb structural body 20 is desirably set to about 20 to 80%. When the porosity is less than 20%, the integrated honeycomb structural body 20 is more susceptible to clogging, while the porosity exceeding 80% causes degradation in the strength of the integrated honeycomb structural body 20, with the result that it can be easily broken.

Here, the above-mentioned porosity can be measured through known methods such as a mercury press-in method, Archimedes' method and a measuring method using a scanning electronic microscope (SEM).

The average pore diameter of the integrated honeycomb structural body 20 is desirably set in a range from 1 to 100 μm. The average pore diameter of less than 1 μm tends to cause clogging of particulates easily. In contrast, the average pore diameter exceeding 100 μm tends to cause particulates to pass through the pores, with the result that the particulates cannot be collected, making the structural body unable to function as a filter.

With respect to the particle size of ceramics to be used upon manufacturing the integrated honeycomb structural body 20, although not particularly limited, those which are less susceptible to shrinkage in the succeeding baking process are desirably used, and for example, those particles, prepared by combining 100 parts by weight of powder having an average particle size from 0.3 to 50 μm with 5 to 65 parts by weight of powder having an average particle size from 0.1 to 1.0 μm, are desirably used. By mixing ceramic powders having the above-mentioned respective particle sizes at the above-mentioned blending rate, it is possible to manufacture an integrated honeycomb structural body made from porous ceramics.

The sealing material to be used in the integrated honeycomb structural body 20 is desirably made from the same porous ceramics as the wall portion. With this arrangement, it becomes possible to increase the bonding strength of the two members, and also to make the thermal expansion coefficient of the wall portion consistent with the thermal expansion coefficient of the sealing material, by adjusting the porosity of the sealing material in the same manner as the wall portion; thus, it becomes possible to prevent a gap from generating between the sealing material and the wall portion due to a thermal stress exerted upon manufacturing and using, and also to prevent cracks from occurring in the sealing material and the wall portion that is made in contact with the sealing material.

In the integrated honeycomb structural body of the present invention, among the through holes placed at corner portions on the circumferential face, at least half or more of the number of the through holes are desirably those constituting the group of large-capacity through holes, and for example, in the case where the integrated honeycomb structural body of the present invention has a square column shape, at least two or more of the through holes located at the four corners of the circumferential face are desirably formed as those constituting the group of large-capacity through holes.

In the case where the honeycomb structural body of the present invention is used as an exhaust gas purifying filter, the outlet-side through holes are less susceptible to deposition of particulates, and with respect to those through holes located at corner portions, the number of adjacent through holes is small to structurally make it difficult for exhaust gases to pass through; therefore, when the outlet-side through holes are located at the corner portions, there is a delay for a temperature rise upon burning particulates in comparison with the other portions to cause a thermal stress concentration and the subsequent occurrence of cracks at the corner portions. Therefore, at least half or more of the number of through holes located at corner portions are arranged as those inlet-side through holes constituting the group of large-capacity through holes so that, upon burning particulates, the burning of particulates is allowed to take place even in those through holes located at the corner portions; thus, it becomes possible to reduce local temperature deviations in the honeycomb structural body of the present invention to a minimum level, and consequently to suppress the occurrence of cracks.

Moreover, when through holes located at corner portions are formed as large-capacity throughholes constituting the group of large-capacity through holes, it is possible to improve the fluidity of gases in the through holes located at the corner portions, and consequently to reduce a temperature difference from the other through holes upon burning particulates or the like; thus, it becomes possible to more effectively suppress the generation of cracks.

In the integrated honeycomb structural body of the present invention, it is preferable to prepare all the through holes located at corner portions on the circumferential face as through holes constituting the group of large-capacity through holes. For example, as shown in FIG. 1, in the case where the numbers of the large-capacity through holes and the small-capacity through holes are approximately the same, with these two types of through holes being alternately aligned, an arrangement in which all the four corners are occupied by the large-capacity through holes makes it possible to increase the aperture rate of the integrated honeycomb structural body of the present invention, and consequently to reduce a pressure loss due to accumulated particulates and the like, in comparison with the arrangement in which, on the contrary, all the four corners are occupied by the small-capacity through holes.

In the integrated honeycomb structural body of the present invention, the shape of cross-sections perpendicular to the length direction of: through holes constituting the group of large-capacity through holes; and/or through holes constituting the group of small-capacity through holes is desirably designed as a polygonal shape.

In the case where the honeycomb structural body of the present invention is used as an exhaust gas purifying filter, by realizing the arrangement wherein the shape of cross-sections perpendicular to the length direction of those through holes is designed as a polygonal shape, it becomes possible to reduce the area of the wall portion in the cross section, and consequently to reduce resistance to be exerted when exhaust gases are allowed to pass through the wall portion, and a main portion of frictional resistance derived from the cross-sectional shape of the through holes is eliminated so that it becomes possible to reduce resistance exerted when exhaust gases pass through the through holes, and consequently to reduce pressure losses more effectively.

In particular, the shape is more desirably a polygonal shape with four or more apexes, and at least one apex thereof desirably is an obtuse angle, and of the through holes constituting the group of large-capacity through holes and the through holes constituting the group of small-capacity through holes, those constituting one of the types desirably has an octagonal shape in the cross-sectional shape perpendicular to the length direction and those constituting the other type desirably has a shape in the cross-sectional shape thereof. Here, the corner portions of the above-mentioned through holes desirably have chamfered faces, such as an R-chamfered face and a C-chamfered face.

With the above-mentioned arrangement, it becomes possible to further reduce pressure losses caused by a friction exerted upon passage of gases through the through holes.

In the integrated honeycomb structural body of the present invention, its cross-section perpendicular to the length direction desirably contains both of: one wall portion shared by a through hole that constitutes the group of large-capacity through holes and the adjacent through hole that constitutes the group of large-capacity through holes; and one wall portion shared by a through hole that constitutes the group of large-capacity through holes and the adjacent through hole that constitutes the group of small-capacity through holes.

Figure 3:
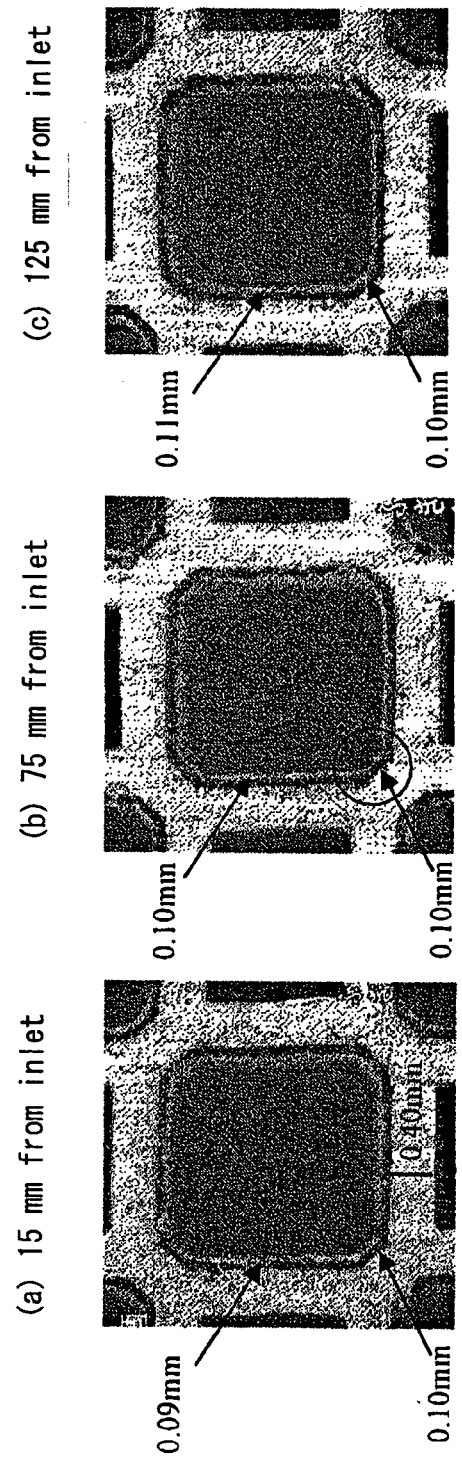
FIGS. 3(a) to 3(c) are photographs that show collecting states of particulates that are observed at different distances from the inlet of the integrated honeycomb structural body of the present invention.

FIGS. 3(a) to 3(c) show photographs that indicate collected states of particulates observed at different distances from the inlet of the integrated honeycomb structural body of the present invention, and as clearly shown by these photographs, in the integrated honeycomb structural body of the present invention, particulates are evenly accumulated not only on the wall portion shared by a through hole that constitutes a group of small-capacity through holes and the adjacent through hole that constitutes a group of large-capacity through holes, but also on the wall portion mutually shared by adjacent large-capacity through holes that constitute the group of large-capacity through holes. The accumulation process is explained as follows. Immediately after the start of the particulate collecting process, since gases are allowed to flow from the large-capacity through holes constituting the group of large-capacity through holes to the small-capacity through holes constituting the group of small-capacity through holes, particulates are accumulated on each wall portion shared by a through hole that constitutes a group of large-capacity through holes and the adjacent through hole that constitutes a the group of small-capacity through holes; however, as the collecting process of particulates has progressed to form a cake layer, it becomes difficult for the gases to pass through the wall portion shared by the large-capacity through hole that constitutes a group of large-capacity through holes and the adjacent small-capacity through hole that constitutes a group of small-capacity through holes, with the result that a gas flow is also generated through the wall portion shared by adjacent large-capacity through holes that constitute the group of large-capacity through holes. Therefore, after the particulate collecting process for a predetermined period, particulates are gradually accumulated evenly on the wall portion shared by adjacent large-capacity through holes that constitute the group of large-capacity through holes.

Therefore, in comparison with a filter which do not have the wall portion shared by adjacent large-capacity through holes that constitute the group of large-capacity through holes with the aperture ratio being set to a fixed value, since the integrated honeycomb structural body of the present invention provides a larger surface area of the wall portion for use in filtration, it is possible to reduce the thickness of particulates to be accumulated on the wall portion, when particulates of the same amount are accumulated. For this reason, in the case of the integrated honeycomb structural body of the present invention, as the time elapses after the start of use, the increasing rate of pressure loss that increases with the elapsed time becomes smaller, thereby making it possible to reduce the pressure loss, from the viewpoint of the entire service life as the filter.

In the honeycomb structural body of the present invention, a cross-section perpendicular to the length direction of those through holes constituting the group of large-capacity through holes and/or those through holes constituting the group of small-capacity through holes is desirably provided with a curved shape in the vicinity of each of the corners.

Since such a curved shape is provided therein, it becomes possible to effectively reduce pressure losses due to friction exerted upon passage of gases through the through holes, and also to prevent the generation of cracks caused by concentrated stress at corner portions (recessed portions) on the cross-section perpendicular to the length direction of the through holes.

In the honeycomb structural body of the present invention, the distance between centers of gravity of cross-sections perpendicular to the length direction of the adjacent through holes constituting the group of large-capacity through holes is desirably set to the same as the distance between centers of gravity of cross-sections perpendicular to the length direction of the adjacent through holes constituting the group of small-capacity through holes.

Since the above-mentioned distance between two center-of-gravity are equal to each other, heat is evenly dispersed upon recovery so that local deviations in temperature in the honeycomb structural body of the present invention are eliminated; thus, it becomes possible to reduce the occurrence of cracks and the like due to thermal stress even after long-term repeated uses, and consequently to improve the durability.

Figure 4:
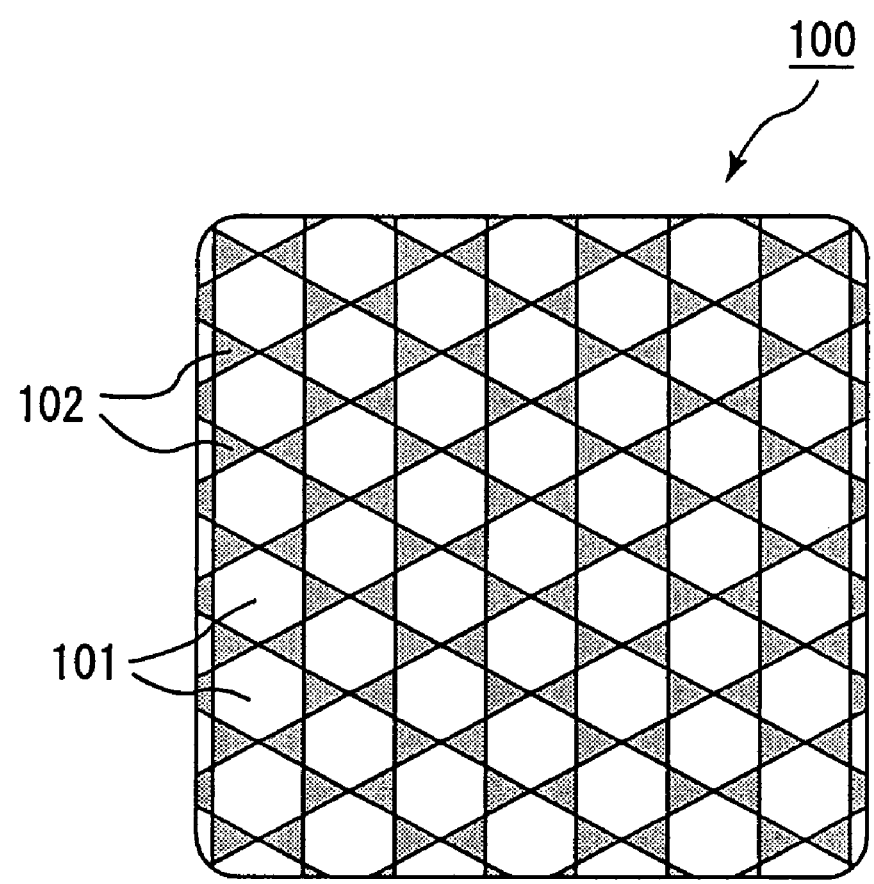
FIG. 4 is a cross-sectional view that schematically shows a cross section perpendicular to the length direction of the integrated honeycomb structural body of the present invention in which the ratio of numbers of through holes between the group of large-capacity through holes 101 and the group of small-capacity through holes 102 is set to 1:2.

In the integrated honeycomb structural body of the present invention, although the number of through holes constituting the group of large-capacity through holes and the number of through holes constituting the group of small-capacity through holes are not particularly limited, it is preferable to set the numbers of both to be substantially the same number. With this arrangement, it becomes possible to minimize those wall portion that are less likely to devote themselves to filtration of exhaust gases, and consequently to prevent pressure losses, due to friction upon passage of gases through the through-hole inlet side and/or friction upon passage of gases through the through-hole outlet side, from excessively increasing. For example, in comparison with a honeycomb structural body 100 with the numbers of through holes being set to 1:2 between the group of large-capacity through holes 101 and the group of small-capacity through holes 102 as shown in FIG. 4, in the case where the numbers of through holes are substantially the same, since the pressure losses due to friction upon passage of gases through the through-hole outlet side are reduced, it becomes possible to reduce pressure losses as the entire honeycomb structural body.

Next, with respect to the cross-sectional shape of the honeycomb structural body of the present invention, the following description will discuss specific examples of the structure of: through holes that constitute the group of large-capacity through holes; and through holes that constitute the group of small-capacity through holes.

FIGS. 5(a) to 5(d) and FIGS. 6(a) to 6(f) are cross-sectional views each of which schematically shows a part of a cross-section perpendicular to the length direction in the integrated honeycomb structural body of the present invention, and FIG. 5(e) is a cross-sectional view which shows a part of a cross-section perpendicular to the length direction in a conventional integrated honeycomb structural body.

In an integrated honeycomb structural body 110 shown in FIG. 5(a), the aperture ratio (A/B), which is a ratio between an area (A) of a cross-section perpendicular to the length direction of each of large-capacity through holes 111a that constitute the group of large-capacity through holes and an area (B) of a cross-section perpendicular to the length direction of each of small-capacity through holes 111b that constitute the group of small-capacity through holes, is set to approximately 1.55, in the case of an integrated honeycomb structural body 120 shown in FIG. 5(b), the aperture ratio is set to approximately 2.54, in the case of an integrated honeycomb structural body 130 shown in FIG. 5(c), the aperture ratio is set to approximately 4.45, in the case of an integrated honeycomb structural body 140 shown in FIG. 5(d), the aperture ratio is set to approximately 6.00. Moreover, in FIGS. 6(a), 6(c) and 6(e), the aperture ratio is set to approximately 4.45 in all the cases, and in FIGS. 6(b), 6(d) and 6(f), the aperture ratio is set to approximately 6.00 in all the cases.

Here, when the aperture ratio is great as in the case of the integrated honeycomb structural body 140 shown in FIG. 5(d), the capacity of the small-capacity through hole becomes too small, with the result that the initial pressure loss tends to become too great.

In FIGS. 5(a) to 5(d), the cross-sectional shape of each of large-capacity through holes 111a, 121a, 131a and 141a all of which constitute the groups of large-capacity through holes is formed into an octagonal shape, and the cross-sectional shape of each of small-capacity through holes 111b, 121b, 131b and 141b all of which constitute the groups of small-capacity through holes is formed into a square shape, and in this arrangement, the through holes of the respective types are alternately arranged, and by changing the cross-sectional area of each small-capacity through hole, with the cross-sectional shape of each large-capacity through hole being slightly changed, the aperture ratio can be easily varied desirably. In the same manner, in the case of the integral honeycomb structural body shown in FIG. 6, the aperture ratio thereof can be varied optionally.

Here, in the case of an integrated honeycomb structural body 150 shown in FIG. 5(e), both of the cross-sectional shapes of the input-side through holes 152a and the output-side through holes 152b have a square shape, and those through holes are alternately arranged respectively.

In integrated honeycomb structural bodies 160 and 260 shown in FIGS. 6(a) and 6(b), the cross-sectional shapes of large-capacity through holes 161a and 261a that constitute the groups of large-capacity through holes are set to a pentagonal shape, and among these, three angles are set to approximately right angles, and the cross-sectional shapes of small-capacity through holes 161b and 261b that constitute the groups of small-capacity through holes are set to a quadrangle shape so that these are allowed to respectively occupy portions of a larger quadrangle shape that diagonally face each other. In integrated honeycomb structural bodies 170 and 270 shown in FIGS. 6(c) and 6(d) which have modified shapes of the cross-sections shown in FIGS. 5(a) to 5(d), a wall portion shared by each of large-capacity throughholes 171a, 271a constituting the group of large-capacity through holes and each of small-capacity through holes 171b, 271b constituting the group of small-capacity through holes is expanded toward the small-capacity through hole side with a certain curvature. This curvature is desirably set, and for example, the curved line forming the wall portion may correspond to a ¼ of the circle. In this case, its aperture ratio is set to 3.66. Therefore, the integrate honeycomb structural bodies 170, 270 shown in FIGS. 6(c) and 6(d) are allowed to have a smaller area in the cross-section of the small-capacity through holes in comparison with the area of those having the curved line constituting the wall portion, which corresponds to a ¼ of the circle. In integrated honeycomb structural bodies 180 and 280 shown in FIGS. 6(e) and 6(f), each of large-capacity through holes 181a, 281a constituting the groups of large-capacity through holes and each of small-capacity through holes 181b, 281b constituting the groups of small-capacity through holes are formed by quadrangle shapes (rectangular shapes), and when two large-capacity through holes and two small-capacity through holes are combined together, a approximately square shape is formed.

Figure 9:
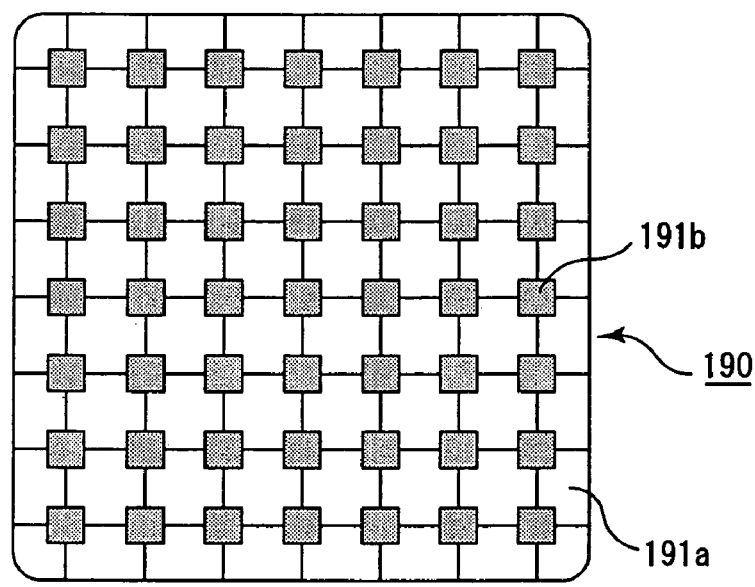
FIG. 9 is a cross-sectional view that schematically shows an example of a part of a cross section perpendicular to the length direction in the integrated honeycomb structural body of the present invention.

With respect to another specific example of the structures of the through holes constituting the group of large-capacity through holes and the group of small-capacity through holes in the cross-sectional shape of the honeycomb structural body of the present invention, the following structures are proposed: an integrated honeycomb structural body 190 shown in FIG. 9 in which large-capacity through holes 191a constituting the group of large capacity through holes and small-capacity through holes 191b constituting the group of small capacity through holes are formed; and integrated honeycomb structural bodies 200, 21, 220 and 230 shown in FIGS. 10(a) to 10(d) in which large-capacity through holes 201a, 211a, 221a and 231a constituting the groups of large-capacity through holes and small-capacity through holes 201b, 211b, 221b and 231b constituting the groups of small-capacity through holes are formed.

The integrated ceramics structural body of the present invention maybe used alone as an integrated filter, or a plurality of them may be combined through sealing material layers, and used as an aggregate-type filter. Here, the integrated filter and the aggregate-type filter have the same functions.

With respect to the material for the integrated filter made of the integrated ceramics structural body of the present invention, normally oxide ceramics such as cordierite are used. This is because: these materials allow manufacturing processes at low costs, and since these have a comparatively small thermal expansion coefficient, the filter becomes less susceptible to damage due to thermal stress during manufacturing processes and use.

Moreover, although not shown in FIG. 1, the integrated filter made of the integrated ceramics structural body of the present invention may have a sealing material layer formed on the circumferential face in the length direction in the same manner as an aggregate-type honeycomb structural body which will be described below. The sealing material layer is desirably formed by a sealing material made from a material that makes gases more difficult to pass through compared to the honeycomb structural body.

The aggregate-type honeycomb structural body of the present invention is formed by a honeycomb block, obtained by combining a plurality of integrated honeycomb structural bodies of the present invention with one another through sealing material layers with its circumferential face in the length direction being covered with a sealing material layer, and is allowed to function as an aggregate-type filter.

Figure 2:
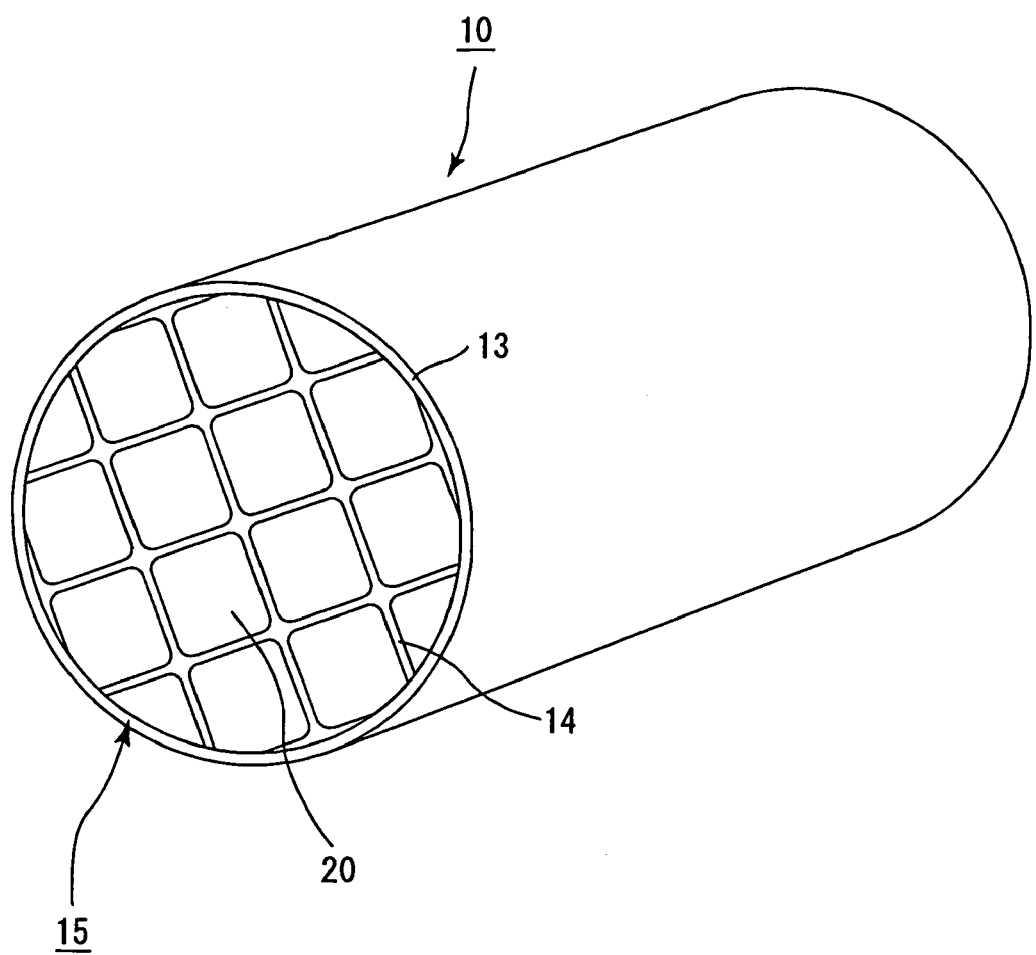
FIG. 2 is a perspective view that schematically shows one example of an aggregate-type honeycomb structural body of the present invention.

FIG. 2 is a perspective view that schematically shows one example of the aggregate-type honeycomb structural body of the present invention.

As shown in FIG. 2, an aggregate-type honeycomb structural body 10, which is used as an exhaust gas purifying filter, has an arrangement in which a plurality of integrated honeycomb structural bodies 20 are combined together through sealing material layers 14 to form a honeycomb block 15, with a sealing material layer 13 for preventing leak of exhaust gases being formed on the circumference of the honeycomb block 15.

The aggregate-type honeycomb structural body 10 shown in FIG. 2 has a cylindrical shape; however, not particularly limited to the cylindrical shape, the aggregate-type honeycomb structural body may have an optional shape, such as an elliptical column shape or a square column shape, and an optional size.

The aggregate-type honeycomb structural body of the present invention maybe formed through processes in which, after a plurality of integrated honeycomb structural bodies of the present invention have been combined with one another, the circumferential portion thereof is machined into a round shape, an elliptical shape or a polygonal shape in its cross-sectional shape. Or, the aggregate-type honeycomb structural body of the present invention maybe formed through processes in which: after cross-sectional shapes of integrated honeycomb structural bodies of the present invention have been preliminarily processed; these are combined with one another by using an adhesive to form a circular shape, an elliptical shape or a polygonal shape in its cross sectional shape. Thus, for example, four integrated honeycomb structural bodies of the present invention, each having a column shape having an arc shape formed by dividing a circle into four in its cross-section, may be combined with one another so that an aggregate-type honeycomb structural body having a cylindrical shape of the present invention may be manufactured.

In the aggregate-type honeycomb structural body 10, silicon carbide, which has great heat resistance, superior mechanical properties and great thermal conductivity, is desirably used as a material that forms the integrated honeycomb structural body 20.

In the aggregate-type honeycomb structural body 10, the sealing material layer 14, which is formed between the integrated ceramics structural bodies 20, desirably has a function for combining a plurality of the integrated ceramics structural bodies 20 with one another; thus, this is desirably made from an adhesive having a bonding function.

Here, the sealing material layer 13 is formed on the circumference of the ceramic block 15. After installation of the integrate-type honeycomb structural body 10 in an exhaust passage of an internal combustion engine, the sealing material layer 13 functions as a sealing member for preventing exhaust gases passing through the through hole from leaking through the circumferential face in the length direction of the ceramic block 15. Thus, it is desirably made from a material (dense material) that is more difficult to pass gasses in comparison with the integrated honeycomb structural body 20.

In the aggregate-type honeycomb structural body 10, the sealing material layer 13 and the sealing material layer 14 may be made from the same material, or may be made from different materials. Here, in the case where the sealing material layer 13 and the sealing material layer 14 are made from the same material, the blended ratio of the materials may be the same or different from each other.

Here, the sealing material layer 14 may be made from a dense material or may be made from a porous material so as to allow exhaust gases to enter the inside thereof, and on the contrary, the sealing material layer 13 is desirably made from a dense material as described above.

With respect to the material constituting the sealing material layer 13 and the sealing material layer 14, not particularly limited, examples thereof include an inorganic binder, an organic binder and a material made from inorganic fibers and/or inorganic particles and the like.

With respect to the inorganic binder, for example, silica sol, alumina sol and the like may be used. These may be used alone or two or more kinds of these may be used in combination. Among the inorganic binders, silica sol is more desirably used.

With respect to the organic binder, examples thereof include polyvinyl alcohol, methyl cellulose, ethyl cellulose and carboxymethyl cellulose. These may be used alone or two or more kinds of these may be used in combination. Among the organic binders, carboxymethyl cellulose is more desirably used.

With respect to the inorganic fibers, examples thereof include ceramics fibers, such as silica-alumina, mullite, alumina and silica. These may be used alone or two or more kinds of these may be used in combination. Among the inorganic fibers, silica-alumina fibers are more desirably used.

With respect to the inorganic particles, examples thereof include carbides and nitrides, and specific examples include inorganic powder comprising silicon carbide, silicon nitride and boron nitride, or whiskers. These may be used alone, or two or more kinds of these may be used in combination. Among the inorganic fine particles, silicon carbide having superior thermal conductivity is desirably used.

As described above, in the case where the integrated honeycomb structural body of the present invention is used as an exhaust gas purifying filter as it is, the sealing material layer in the aggregate-type honeycomb structural body of the present invention may be placed on the circumferential face in the length direction of the integrated honeycomb structural body of the present invention.

Next, the following description will discuss one example of a manufacturing method for the above-mentioned honeycomb structural body of the present invention.

In the case where the honeycomb structural body of the present invention is an integrated filter that is entirely composed of a sintered body, first, a material paste mainly composed of ceramics as described above is subjected to an extrusion-molding process so that a ceramics molded body, which has approximately the same shape as the integrated honeycomb structural body of the present invention with chamfered faces on its corner portions of the circumferential face, is formed.

With respect to the above-mentioned material paste, although not particularly limited, those pastes which allow the honeycomb structural body of the present invention to have a porosity of 20 to 80% after the manufacturing processes, and, for example, those pastes prepared by adding a binder and a dispersant solution to powder comprising the above-mentioned ceramics are desirably used.

With respect to the above-mentioned binder, not particularly limited, examples thereof include: methyl cellulose, carboxymethyl cellulose, hydroxyethyl cellulose, polyethylene glycol, phenolic resins, epoxy resins and the like.

Normally, the blended amount of the above-mentioned binder is desirably set to 1 to 10 parts by weight with respect to 100 parts by weight of ceramics powder.

With respect to the above-mentioned dispersant solution, not particularly limited, for example, an organic solvent such as benzene and the like, alcohol such as methanol and the like, water and the like may be used.

An appropriate amount of the above-mentioned dispersant solution is blended so that the viscosity of the material paste is set in a predetermined range.

These ceramics powder, binder and dispersant solution are mixed by an attritor or the like, and sufficiently kneaded by a kneader or the like, and then extrusion-molded so that the above-mentioned ceramics molded body is formed.

Moreover, a molding auxiliary may be added to the above-mentioned material paste, if necessary.

With respect to the molding auxiliary, not particularly limited, examples thereof include: ethylene glycol, dextrin, fatty acid soap and polyalcohol.

Furthermore, a pore-forming agent, such as balloons that are fine hollow spheres composed of oxide-based ceramics, spherical acrylic particles and graphite, may be added to the above-mentioned material paste, if necessary.

With respect to the above-mentioned balloons, not particularly limited, for example, alumina balloons, glass micro-balloons, shirasuballoons, flyashballoons (FA-balloons) and mullite balloons may be used. Among these, fly ash balloons are more desirably used.

Further, after the above-mentioned ceramics molded body has been dried by using a drier such as a microwave drier, a hot-air drier, a dielectric drier, a reduced-pressure drier, a vacuum drier and a frozen drier, predetermined through holes are filled with sealing material paste to form sealing members so that a mouth-sealing process for plugging the through holes is carried out.

With respect to the above-mentioned sealing material paste, although not particularly limited, those pastes which allow the sealing members to be formed through following processing to have a porosity of 20 to 80%, and, for example, those pastes, prepared by adding a lubricant, a solvent, a binder and a dispersant solution to ceramics powder used as the above-mentioned material paste, are desirably used. With this arrangement, it becomes possible to prevent ceramics particles from settling during the sealing process.

Next, the ceramics dried body which has been filled with the sealing material paste is subjected to degreasing and firing processes under predetermined conditions so that the integrated honeycomb structural body of the present invention, made from porous ceramics and constituted by a sintered body in its entire structure, is manufactured.

Here, with respect to the degreasing and sintering conditions and the like of the ceramics dried body, it is possible to apply conditions that have been conventionally used for manufacturing filters made from porous ceramics.

Figure 7:
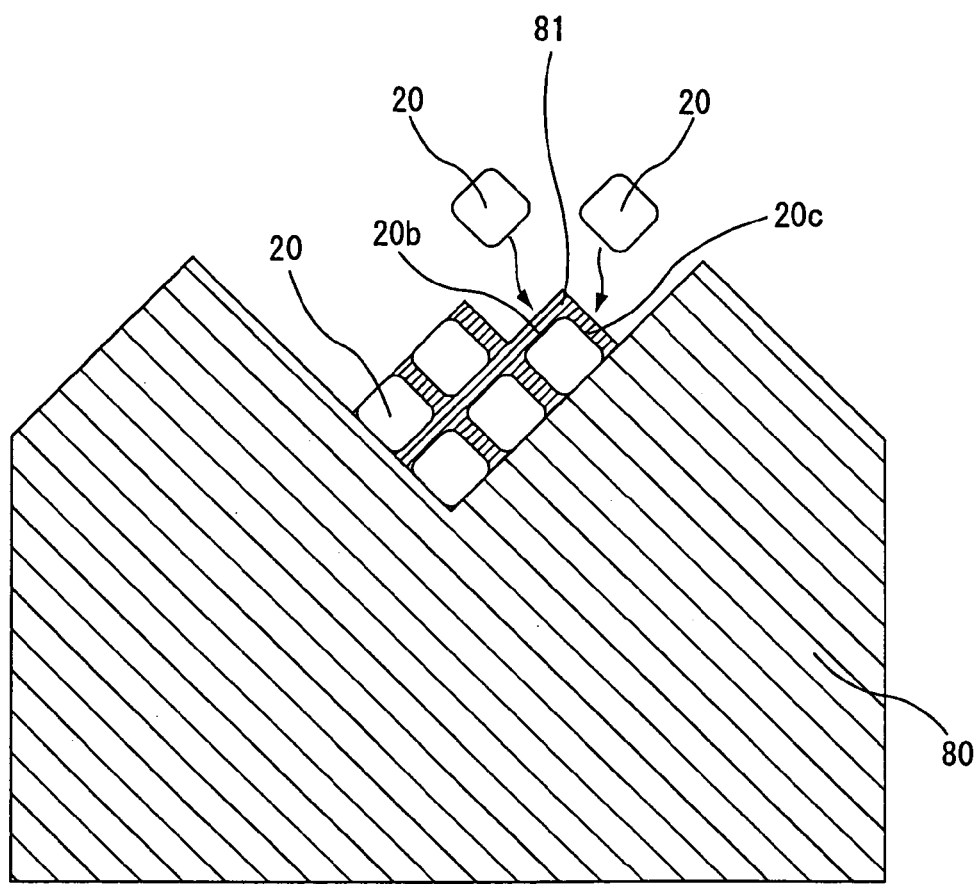
FIG. 7 is a side view that schematically shows one process of manufacturing processes of an aggregate-type filter 10 of the present invention.

Moreover, in the case where, as shown in FIG. 2, the honeycomb structural body of the present invention is as an aggregate-type honeycomb structural body constituted by a plurality of integrated honeycomb structural bodies of the present invention combined through sealing material layers, the integrated honeycomb structural bodies 20 are placed in a tilted manner on a base 80 the upper portion of which is designed to have a V-letter shape in its cross-section so as to allow the integrated honeycomb structural bodies 20 to be stacked thereon in a diagonally tilted manner as shown in FIG. 7. Then, sealing material paste to form the sealing material layer 14 is applied onto two side faces 20b and 20c facing upward with an even thickness to form a sealing material paste layer 81; thereafter, a laminating process for forming another integrated honeycomb structural body 20 on this sealing material paste layer 81 is successively repeated so that a laminated body of integrated honeycomb structural bodies 20 having a predetermined size and a square-column shape is manufactured.

With respect to the material for forming the above-mentioned sealing material paste, since the explanation thereof has already been given, the description thereof is omitted.

Next, this laminated body of integrated honeycomb structural bodies 20 is heated so that the sealing material paste layer 81 is dried and solidified to form a sealing material layer 14, and the circumferential face of this is then cut into a shape as shown in FIG. 2 by using, for example, a diamond cutter or the like; thus, a ceramic block 15 is manufactured.

Further, a sealing material layer 13 is formed on the circumference of the ceramic block 15 by using the above-mentioned sealing member paste so that the aggregate-type filter 10 of the present invention, formed by combining a plurality of integrated honeycomb structural bodies 20 with one another through sealing material layers 14, is manufactured.

With respect to the application of the honeycomb structural body of the present invention, although not particularly limited, it is desirably used for exhaust gas purifying apparatuses for use in vehicles.

Figure 8:
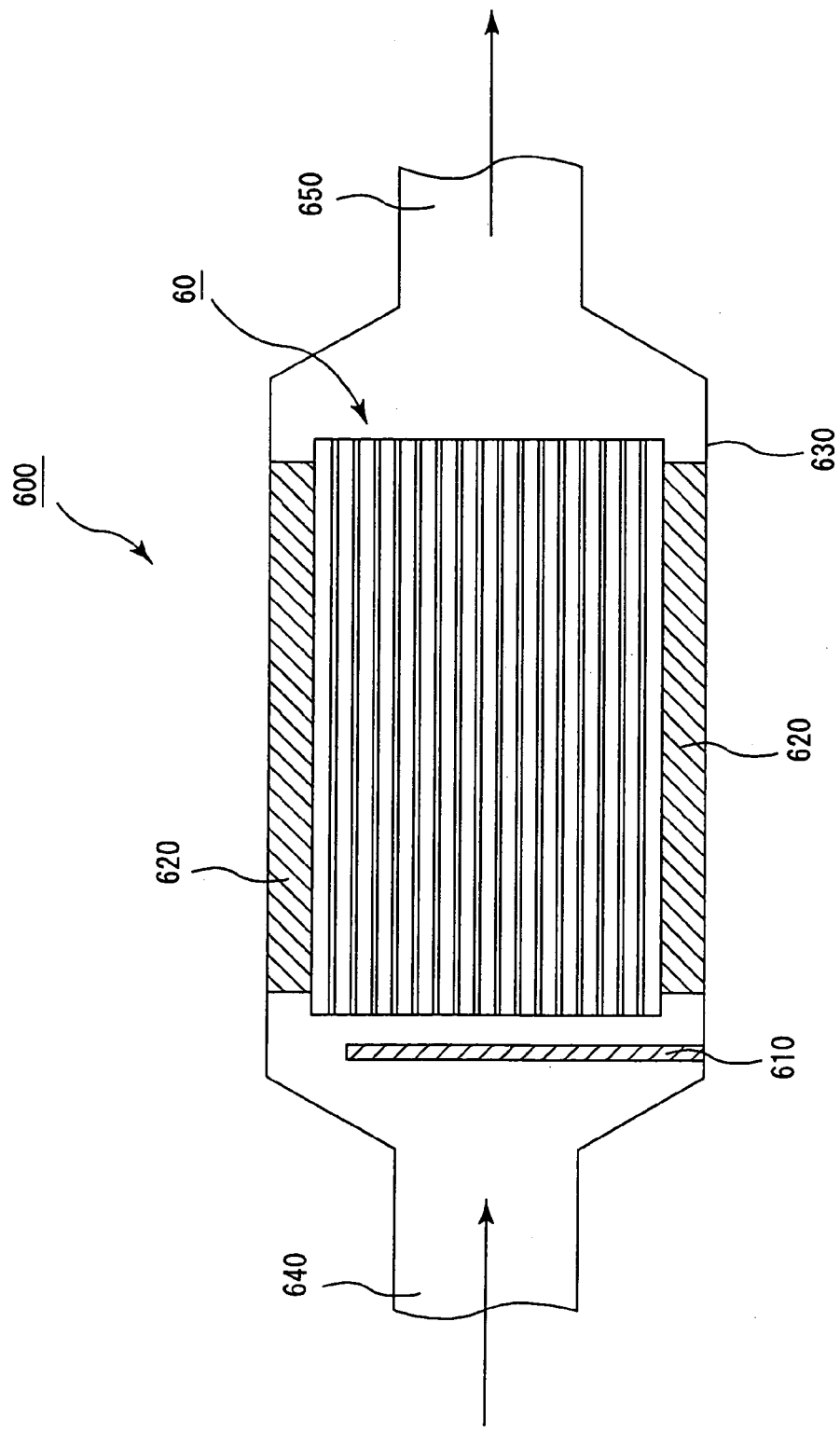
FIG. 8 is a cross-sectional view that schematically shows an example of an exhaust gas purifying apparatus in which the honeycomb structural body of the present invention is used.

FIG. 8 is a cross-sectional view that schematically shows one example of an exhaust gas purifying apparatus for use in vehicles, which is provided with the honeycomb structural body of the present invention.

As shown in FIG. 8, an exhaust gas purifying apparatus 600 is mainly constituted by a honeycomb structural body 60, a casing 630 that covers the external portion of the honeycomb structurally body 60, a holding sealing material 620 that is placed between the honeycomb structural body 60 and the casing 630 and a heating means 610 placed on the exhaust gas flowing side of the honeycomb structural body 60. And, an introducing pipe 640, which is connected to an internal-combustion device such as an engine, is connected to one end of the casing 630 on the exhaust-gas inputting side, and a discharging pipe 650 externally connected is connected to the other end of the casing 630. In FIG. 8, arrow marks show flows of exhaust gases.

Moreover, in FIG. 8, the honeycomb structural body 60 may be the integrated honeycomb structural body 10 shown in FIG. 1 or the aggregate-type honeycomb structural body shown in FIG. 2.

In the exhaust gas purifying apparatus 600 having the above-mentioned arrangement, exhaust gases, discharged from the internal combustion device such as an engine and the like, are directed into the casing 630 through the introducing pipe 640, and allowed to flow into the honeycomb structural body 60 through the input-side through holes and to pass through the wall portion; thus, the exhaust gases are purified, with particulates thereof being collected in the wall portion, and are then discharged out of the honeycomb structural body 60 through the outlet-side through holes, and discharged outside through the exhaust pipe 650.

After a great amount of particulates have been accumulated on the wall portion of the honeycomb structural body 60 to cause an increase in pressure losses, the honeycomb structural body 60 is subjected to a recovering process.

In the recovering process, a gas, heated by using a heating means 610, is allowed to flow into the through holes of the honeycomb structural body 60 so that the honeycomb structural body 60 is heated to burn and eliminate the particulates deposited on the wall portion.

Moreover, the particulates may be burned and eliminated by using a post-injection system.

Moreover, the honeycomb structural body of the present invention may carry a catalyst capable of purifying CO, HC, NOx and the like in the exhaust gases.

When such a catalyst is carried thereon, the honeycomb structural body of the present invention is allowed to function as a filter capable of collecting particulates in exhaust gases, and also to function as a catalyst converter for purifying CO, HC, NOx and the like contained in exhaust gases.

The above-mentioned catalyst may be carried on the surface of each of particles constituting the honeycomb structural body of the present invention in a manner so as not to plug the pores thereof, or may be carried on the wall portion with a certain thickness. Moreover, the above-mentioned catalyst may be evenly carried on the surfaces of the wall portion of the through holes and/or the surface of each of the particles, or may be carried on a specific place in a biased manner. In particular, when the catalyst is carried on the surfaces of the wall portion of the inlet-side through holes or on the surface of each of particles in the vicinity of the surfaces, or on both of these portions, the catalyst is easily made in contact with the particulates so that the particulates can be efficiently burned.

With respect to the catalyst to be carried on the honeycomb structural body of the present invention, not particularly limited as long as it can purify CO, HC, NOx and the like, examples thereof include noblemetals such as platinum, palladium, rhodium and the like. The catalyst, made from these noble metals, is a so-called three-way catalyst, and the honeycomb structural body of the present invention on which such a three-way catalyst is carried is allowed to function in the same manner as conventionally known catalyst converters. Therefore, with respect to the case in which the honeycomb structural body of the present invention also functions as a catalyst converter, detailed description thereof is omitted.

BEST MODE FOR CARRYING OUT THE INVENTION

Referring to FIGS. 1 and 2, the following description will describe the present invention in detail by means of examples; however, the present invention is not intended to be limited by these examples.

EXAMPLE 1

(1) Powder of α-type silicon carbide having an average particle size of 10 μ(60% by weight) and powder of β-type silicon carbide having an average particle size of 0.5 μm (40% by weight) were wet-mixed, and to 100parts by weight of the resulting mixture were added and kneaded 5 parts by weight of an organic binder (methyl cellulose) and 10 parts by weight of water to obtain a mixed composition. Next, after a slight amount of a plasticizer and a lubricant have been added and kneaded therein, the resulting mixture was extrusion-molded so that a square columnar raw molded body, which had approximately the same cross-sectional shape as the cross-sectional shape shown in FIG. 5(*b*) and R-chamfered faces with an R-dimension of 0.3 mm on corner portions on the circumferential face, with four through holes located at the four corners being large-capacity through holes 21*a*, was manufactured.

Next, the above-mentioned raw molded body was dried by using a micro-wave drier or the like to form a ceramics dried body, and predetermined through holes were then filled with a sealing material paste having the same composition as the raw molded body. After having been again dried by using a drier, this was degreased at 400° C., and sintered at 2200° C. in a normal-pressure argon atmosphere for 3 hours to manufacture an integrated honeycomb structural body 20, which was a silicon carbide sintered body, and had a porosity of 42%, an average pore diameter of 9 μm, a size of 34.3 mm×34.3 mm×150 mm, the number of through holes 21 of 28/cm$^2$ (large-capacity through holes 21*a*: 14 pcs/cm$^2$, small-capacity through holes 21*b*: 14 pcs/cm$^2$) and a thickness of all the wall portion 23 of 0.4 mm, with corner portions 20*a* on the circumferential face being provided with R-chamfered faces having an R-dimension of 0.3 mm.

Here, in the integrated honeycomb structural body 20, on the end face on the outlet side, only the large-capacity through holes 21*a* are sealed with a sealing agent, and on the end face of the inlet side, only the small-capacity through holes 21*b* are sealed with a sealing agent, with all the four through holes located on the four corners being formed as large-capacity through holes 21*a* with sealed end faces on the outlet side.

(2) By using a heat resistant sealing material paste containing 30% by weight of alumina fibers having a fiber length of 0.2 mm, 21% by weight of silicon carbide particles having an average particle size of 0.6 μm, 15% by weight of silica sol, 5.6% by weight of carboxymethyl cellulose and 28.4% by weight of water, the processes as explained by reference to FIG. 7 were carried out so that a number of the integrated honeycomb structural bodies 20 were combined with one another, and this was then cut by using a diamond cutter to form a cylindrical shaped ceramic block 15.

In this case, the thickness of the sealing material layers for combining the integrated honeycomb structural bodies 20 was adjusted to 1.0 mm.

Next, ceramics fibers made from alumina silicate (shot content: 3%, fiber length: 0.1 to 100 mm) (23.3% by weight),which served as inorganic fibers, silicon carbide powder having an average particle size of 0.3 μm (30.2% by weight), which served as inorganic particles, silica sol (SiO$_2$ content in the sol: 30% by weight) (7% by weight), which served as an in organic binder, carboxymethyl cellulose (0.5% by weight), which served as an organic binder, and water (39% by weight) were mixed and kneaded to prepare a sealing material paste.

Next, a sealing material paste layer having a thickness of 0.2 mm was formed on the circumferential portion of the ceramic block 15 by using the above-mentioned sealing material paste. Further, this sealing material paste layer was dried at 120° C. so that a cylindrical shaped aggregate-type honeycomb structural body 10 having a diameter of 143.8 mm and a length of 150 mm was manufactured.

EXAMPLES 2 TO 4

The same processes as Example 1 were carried out except that the R-dimension of R-chamfered faces formed on corner portions of the circumferential face of each of the integrated honeycomb structural bodies 20 was set to 0.4 mm (Example 2), 0.6 mm (Example 3) and 0.8 mm (Example 4) respectively so that the aggregate-type honeycomb structural body 10 was manufactured.

EXAMPLES 5 TO 8

The same processes as Examples 1 to 4 were carried out except that the extrusion-molding process was carried out by changing a die so that a raw molded body having a square column shape, which had more through holes by one row in each of longitudinal and lateral rows, with four through holes located at the four corners being constituted by two large-capacity through holes 21*a* and two small-capacity through holes 21b, was manufactured and that a sealing material paste was injected so that each of the large-capacity through holes 21a was sealed at the end face on the outlet side with each of the small-capacity through holes 21b being sealed at the end face on the inlet side; thus, an aggregate-type honeycomb structural body 10 was manufactured.

Here, the R-dimension of R-chamfered faces formed on corner portions of the circumferential face of each of the integrated honeycomb structural bodies 20 was set to 0.3 mm (Example 5), 0.4 mm (Example 6), 0.6 mm (Example 7) and 0.8 mm (Example 8), respectively.

EXAMPLES 9 TO 23

The same processes as Example 1 were carried out except that the cross-sectional shape perpendicular to the length direction of the integrated honeycomb structural body 20 was changed as shown in Table 1 so that each of aggregate-type honeycomb structural bodies 10 was formed.

Here, the R-dimension of R-chamfered faces formed on corner portions of the circumferential face of each of the integrated honeycomb structural bodies 20 was set to 0.3 mm.

EXAMPLE 24

(1) Powder of a-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a mixed composition. Next, after a slight amount of a plasticizer and a lubricant have been added and further kneaded therein, the resulting mixture was extrusion-molded so that a square columnar raw molded body, which had approximately the same cross-sectional shape as the cross-sectional shape shown in FIG. 5(b) and R-chamfered faces with an R-dimension of 0.3 mm on corner portions on the circumferential face, with four through holes located at the four corners being formed as large-capacity through holes 21a, was manufactured.

Next, the above-mentioned raw molded body was dried by using a micro-wave drier or the like to form a ceramics dried body, and predetermined through holes were then filled with a sealing material paste having the same composition as the raw molded body. After having been again dried by using a drier, this was degreased at 400° C., and sintered at 2200° C. in a normal-pressure argon atmosphere for 3 hours to manufacture a plurality of square-columnar integrated honeycomb structural bodies 20 each of which was a silicon carbide sintered body, and had a porosity of 42%, an average pore diameter of 9 μm, a size of 34.3 mm×34.3 mm×150 mm, the number of through holes 21 of 28/cm$^2$ (large-capacity through holes 21a:14 pcs/cm$^2$, small-capacity through holes 21b:14 pcs/cm$^2$ ) and a substantial thickness of all the wall portion 23 of 0.4 mm, with corner portions 20a on the circumferential face being provided with R-chamfered faces having an R-dimension of 0.3 mm.

Moreover, in the same manner as the square-columnar integrated honeycomb structural body 20, the extrusion-molding process was carried out by using a die that has been changed so that a plurality of columnar integrated honeycomb structural bodies 20 which have polygonal shapes (for example, arc shape) in the end faces thereof, with only the shape of the circumferential face being changed in comparison with the square-columnar integrated honeycomb structural body 20 were formed.

Here, the plurality of the columnar integrated honeycomb structural bodies 20 with polygonal shapes in the end faces thereof, thus manufactured, had different shapes on the respective circumferential faces; thus, in this arrangement, a plurality of square-columnar integrated honeycomb structural bodies 20 are combined with a plurality of columnar integrated honeycomb structural bodies 20 with polygonal shapes in the end faces thereof, in such a manner that a cylindrical ceramic block 15 can be formed. Moreover, each of the columnar integrated honeycomb structural bodies 20 with polygonal shapes in the end faces thereof has R-chamfered faces with an R-dimension of 0.3 on corner portions on the circumferential face, and all the through holes located at the corner portions are the large-capacity through holes 21a.

Moreover, with respect to the square-columnar integrated honeycomb structural body 20 and the columnar integrated honeycomb structural body 20 with a polygonal shape in the end face thereof, only the large-capacity through holes 21a are sealed with a sealing agent on the end face of the outlet side, and only the small-capacity through holes 21b are sealed with a sealing agent on the end face of the inlet side, with all the through holes located at the corner portions being formed as the large-capacity through holes 21a that are sealed at the end face on the outlet side.

(2) By using the heat resistant sealing material paste manufactured in Example 1, a plurality of square-columnar integrated honeycomb structural bodies 20 and a plurality of columnar integrated honeycomb structural bodies 20 with polygonal shapes in the end faces thereof are respectively combined with one another to form a cylindrical shaped ceramic block 15.

In this case, the thickness of the sealing material layers for combining the square-columnar integrated honeycomb structural bodies 20 and the columnar integrated honeycomb structural bodies 20 with polygonal shapes in the end faces thereof with one another was adjusted to 1.0 mm.

Next, a sealing material paste layer having a thickness of 0.2 mm was formed on the circumferential portion of the ceramic block 15 by using the sealing material paste manufactured in Example 1. Further, this sealing material paste layer was dried at 120° C. so that a cylindrical shaped aggregate-type honeycomb structural body 10 having a diameter of 143.8 mm and a length of 150 mm was manufactured.

EXAMPLES 25 TO 39

The same processes as Examples 9 to 23 were carried out except that the R-dimension of the R-chamfered faces formed on corner portions of the circumferential face of the integrated honeycomb structural body 20 was set to 0.8 mm; thus, an integrated honeycomb structural body 10 was manufactured.

EXAMPLE 40

The same processes as Example 24 were carried out except that, with respect to the square-columnar integrated honeycomb structural bodies 20 and the columnar integrated honeycomb structural bodies 20 with polygonal shapes in the end faces thereof, the R-dimension of the R-chamfered faces formed on corner portions thereof was set to 0.8 mm; thus, an aggregate-type honeycomb structural body 10 was manufactured.

EXAMPLES 41 TO 44

The same processes as Examples 1, 4, 5 and 8 were carried out except that the R-chamfered faces formed on corner portions on the circumferential face of the integrated honeycomb structural body 20 were changed to C-chamfered faces; thus, an aggregate-type honeycomb structural body 10 was manufactured.

REFERENCE EXAMPLES 1 TO 6

The same processes as Examples 1 to 4, 41 and 43 were carried out except that the extrusion-molding process was carried out by changing a die so that a raw molded body having a square column shape in which four through holes located on four corners were formed as small-capacity through holes 21b, with all the four through holes located on the four corners being filled with sealing material paste so as to form the small-capacity through holes 21b sealed at the end face on the inlet side; thus, an aggregate-type honeycomb structural body 10 was manufactured.

REFERENCE EXAMPLES 7 TO 12

The same processes as Examples 1 and 5 as well as Reference Example 1 were carried out except that the R-dimension of the R-chamfered faces formed on corner portions of the circumferential face of the integrated honeycomb structural body 20 was set to 0.1 mm (Reference Examples 7, 9, 11) or 0.2 mm (Reference Examples 8, 10, 12); thus, an aggregate-type honeycomb structural body 10 was manufactured.

Here, Reference Examples 7 and 8 are associated with Example 1, Reference Examples 9 and 10 are associated with Example 5, and Reference Examples 11 and 12 are associated with Reference Example 1.

REFERENCE EXAMPLES 13 TO 31

The same processes as Examples 9 to 24, 41 and 42 as well as Reference Example 5 were carried out except that the R-dimension of the R-chamfered faces formed on corner portions of the circumferential face of the integrated honeycomb structural body 20 was set to 0.1 mm; thus, an aggregate-type honeycomb structural body 10 was manufactured.

REFERENCE EXAMPLES 32 TO 47

The same processes as Example 1 were carried out except that cross-sectional shapes perpendicular to the length direction of the integrated honeycomb structural bodies 20 were respectively formed into shapes shown in Table 2 and that the R-dimension of the R-chamfered faces formed on corner portions of the circumferential face was set to 5.5 mm; thus, an aggregate-type honeycomb structural body 10 was manufactured.

COMPARATIVE EXAMPLES 1 TO 17

The same processes as Example 1 were carried out except that cross-sectional shapes perpendicular to the length direction of the integrated honeycomb structural bodies 20 were respectively formed into shapes shown in Table 3 and that no chamfered faces were formed on corner portions of the circumferential face; thus, an aggregate-type honeycomb structural body 10 was manufactured.

Evaluation Method (1) Recovery limit value

Figure 11:
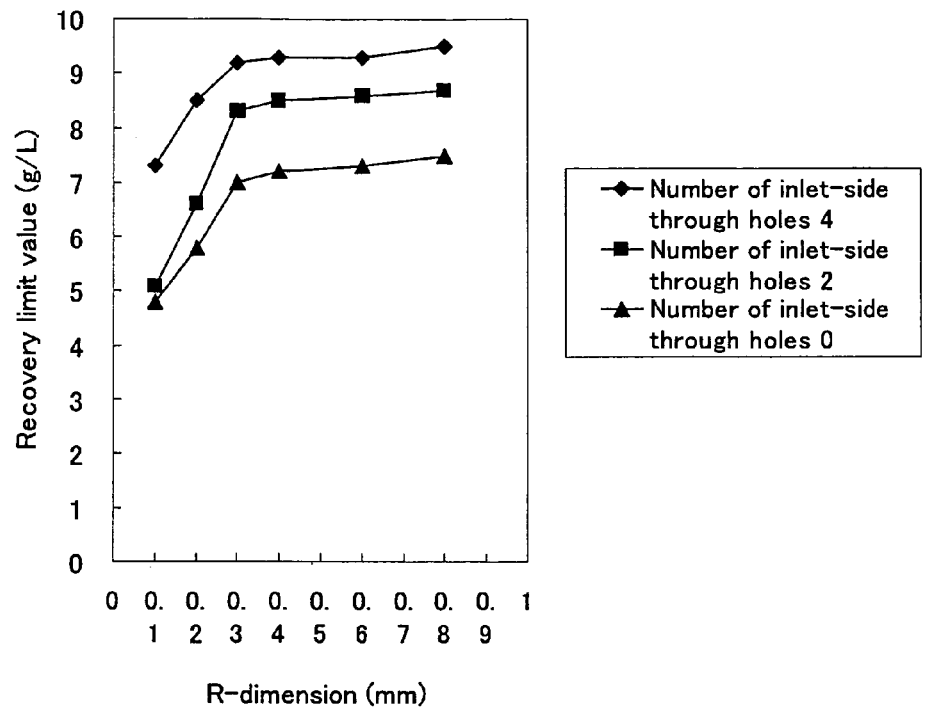
FIG. 11 is a graph which relates to an aggregate-type honeycomb structural body in accordance with Examples 1 to 8 as well as Reference Examples 1 to 4 and 7 to 12, and shows the relationship between an R dimension of an R-chamfered face and a recovery limit value.
Figure 12:
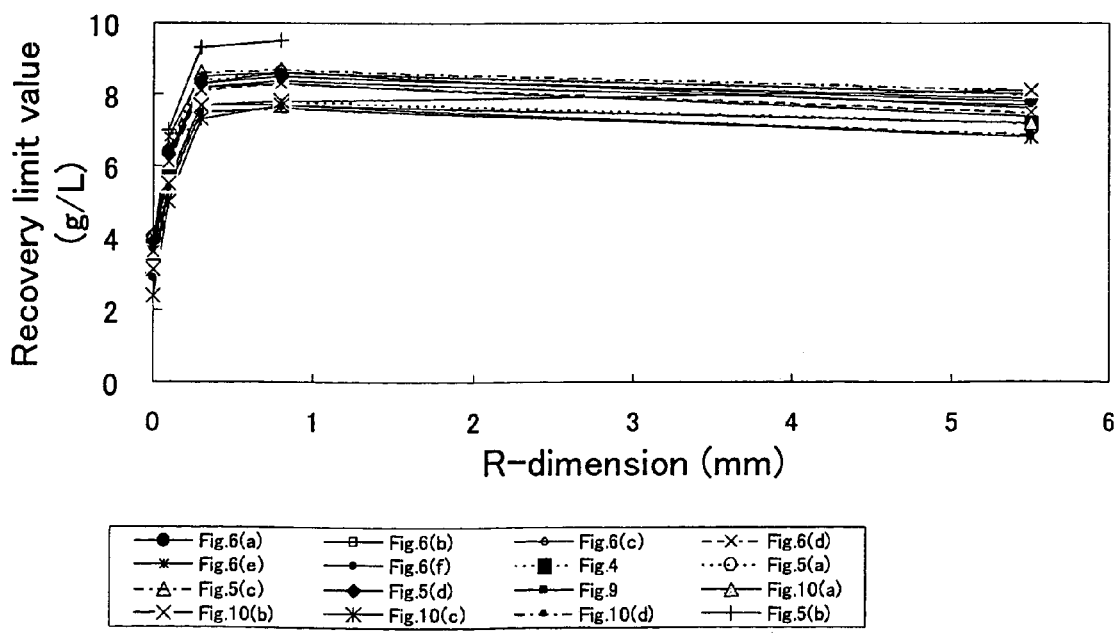
FIG. 12 is a graph which relates to an aggregate-type honeycomb structural body in accordance with Examples 9 to 40, Reference Examples 13 to 28, 32, and 34 to 47, as well as Comparative Examples 1 and 3 to 16, and shows the relationship between an R dimension of an R-chamfered face and a recovery limit value.
Figure 13:
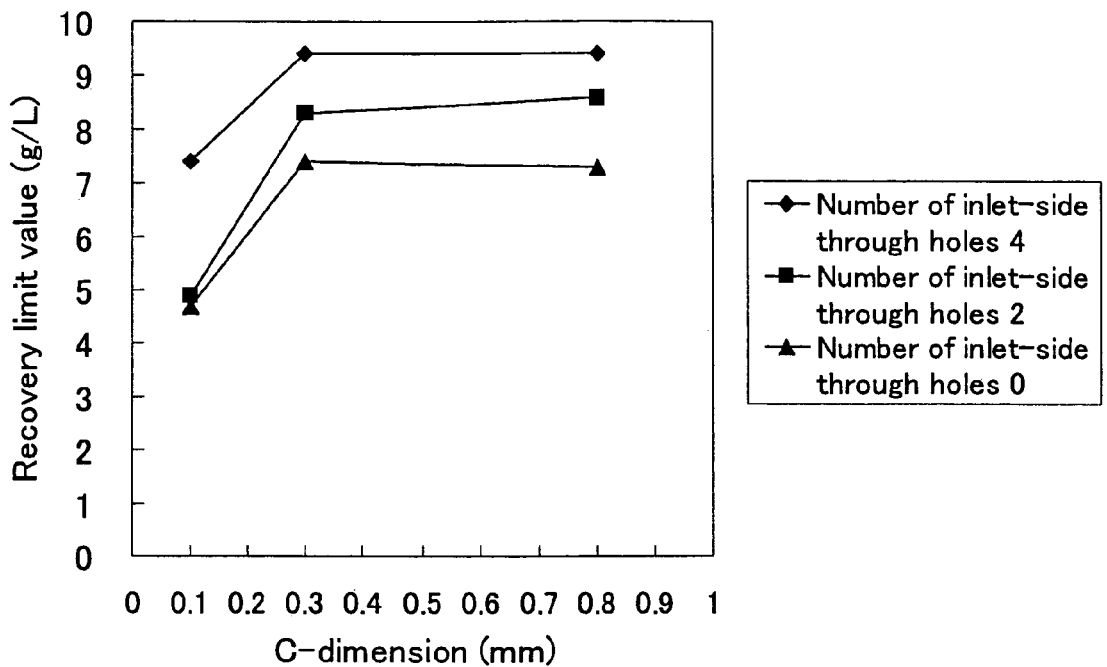
FIG. 13 is a graph which relates to an aggregate-type honeycomb structural body in accordance with Examples 41 to 44 as well as Reference Examples 5, 6, and 29 to 31, and shows the relationship between a C dimension of a C-chamfered face and a recovery limit value.
Figure 14:
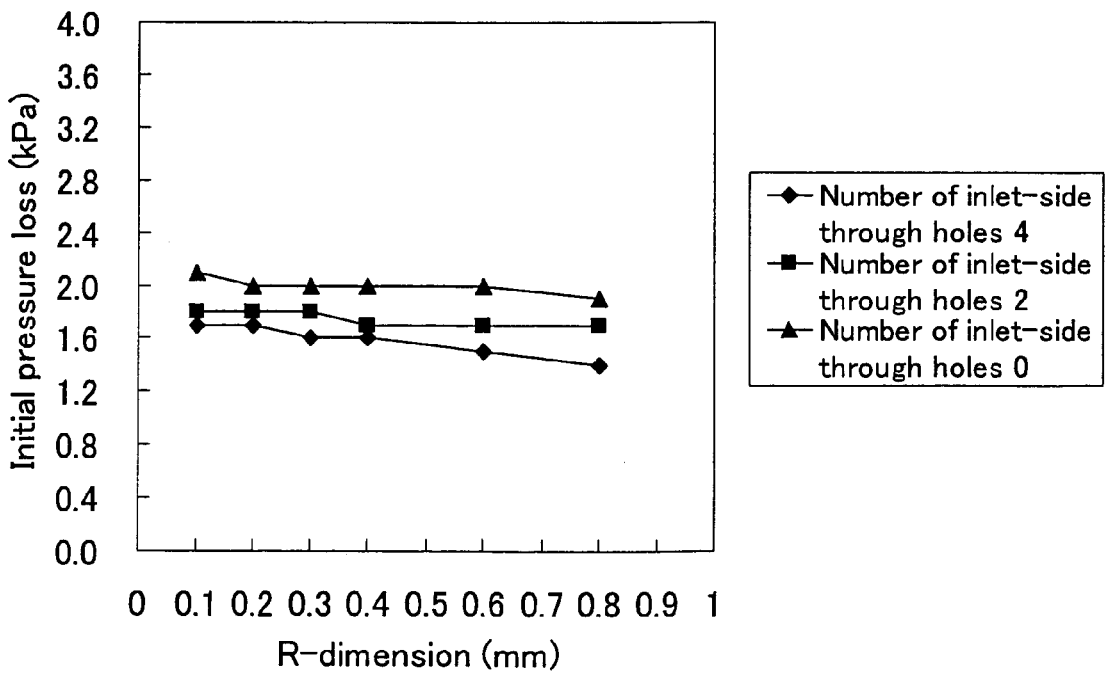
FIG. 14 is a graph which relates to an aggregate-type honeycomb structural body in accordance with Examples 1 to 8 as well as Reference Examples 1 to 4 and 7 to 12, and shows the relationship between an R dimension of an R-chamfered face and an initial pressure loss.
Figure 15:
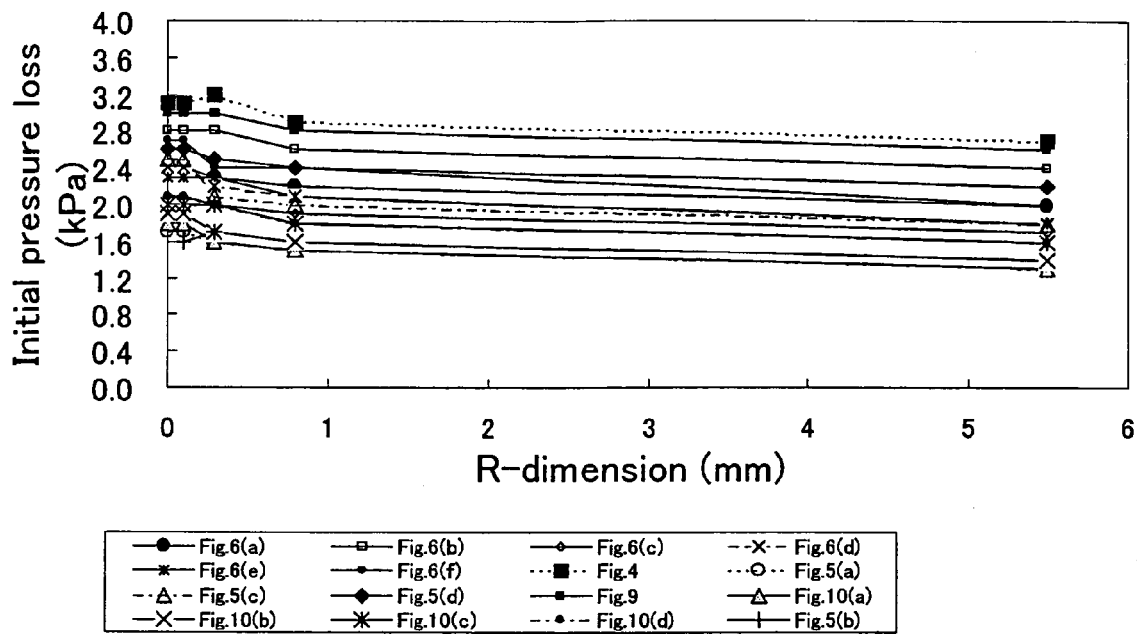
FIG. 15 is a graph which relates to an aggregate-type honeycomb structural body in accordance with Examples 9 to 40, Reference Examples 13 to 28, 32, and 34 to 47, as well as Comparative Examples 1 and 3 to 16, and shows the relationship between an R dimension of an R-chamfered face and an initial pressure loss.
Figure 16:
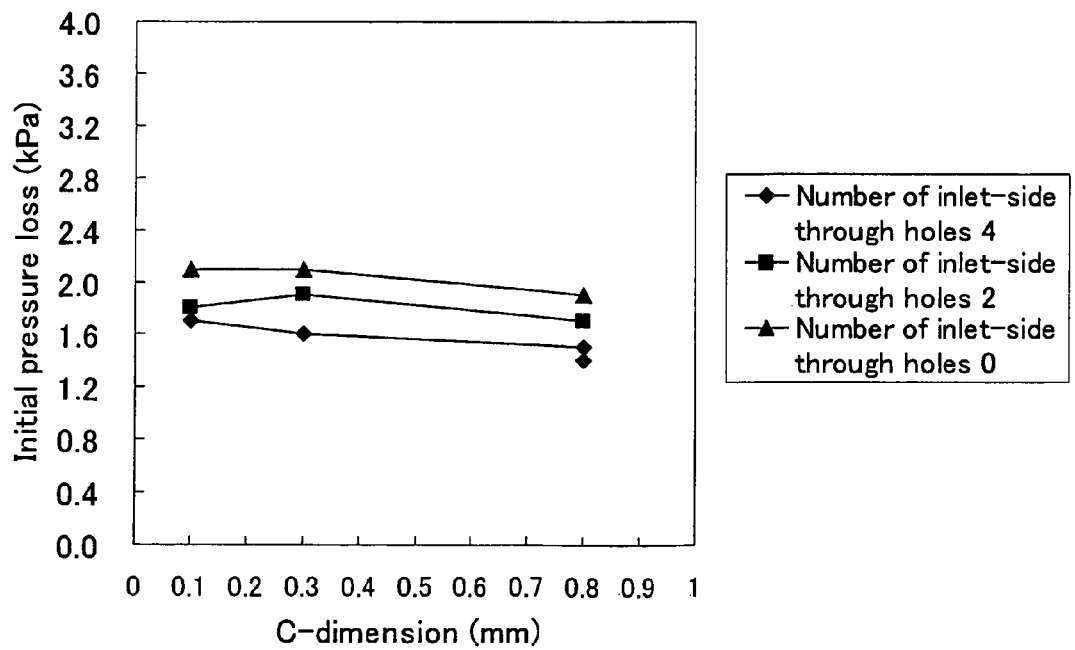
FIG. 16 is a graph which relates to an aggregate-type honeycomb structural body in accordance with Examples 41 to 44 as well as Reference Examples 5, 6, and 29 to 31, and shows the relationship between a C dimension of a C-chamfered face and an initial pressure loss.
Figure 17:
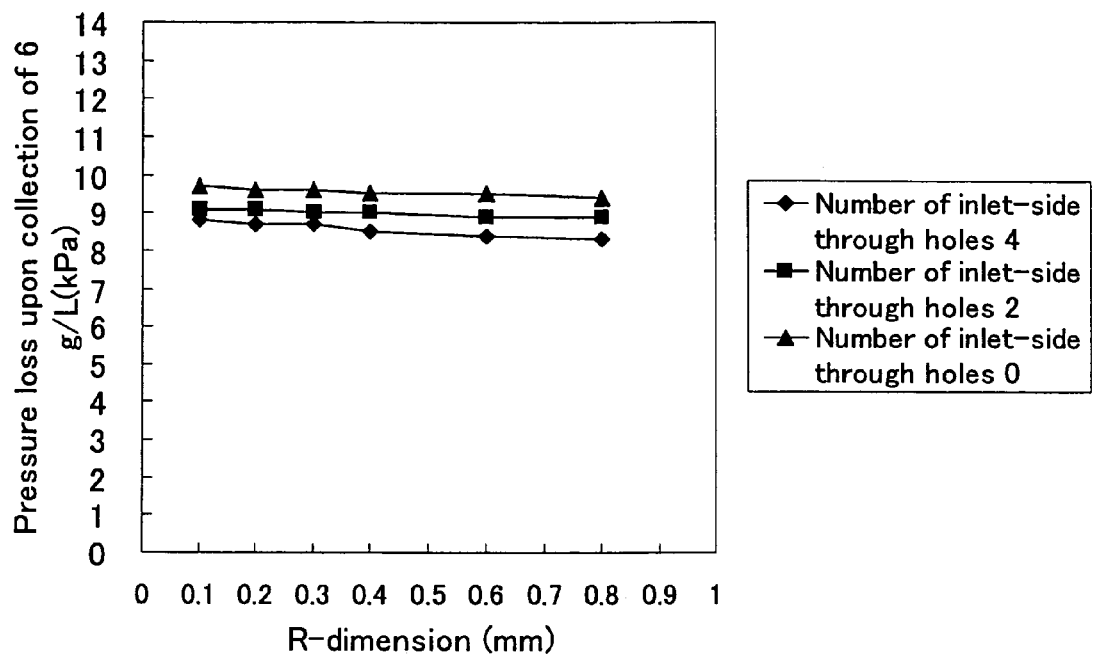
FIG. 17 is a graph which relates to an aggregate-type honeycomb structural body in accordance with Examples 1 to 8 as well as Reference Examples 1 to 4 and 7 to 12, and shows the relationship between an R dimension of an R-chamfered face and a pressure loss at the time of collection of 6 g/L.
Figure 18:
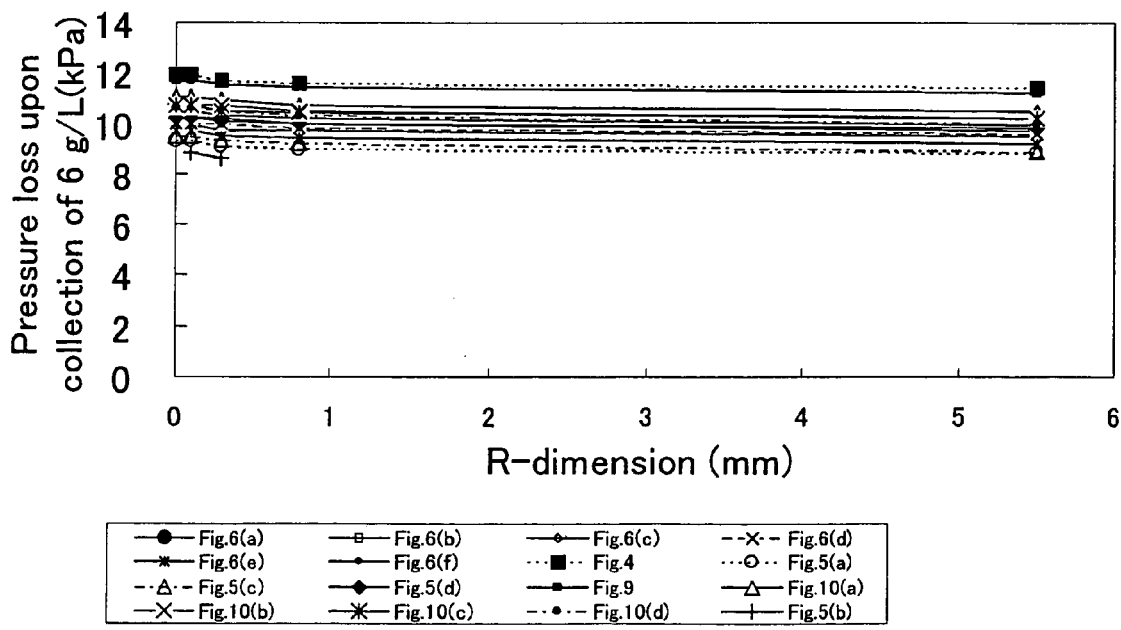
FIG. 18 is a graph which relates to an aggregate-type honeycomb structural body in accordance with Examples 9 to 40, Reference Examples 13 to 28, 32, and 34 to 47, as well as Comparative Examples 1 and 3 to 16, and shows the relationship between an R dimension of an R-chamfered face and a pressure loss at the time of collection of 6 g/L.
Figure 19:
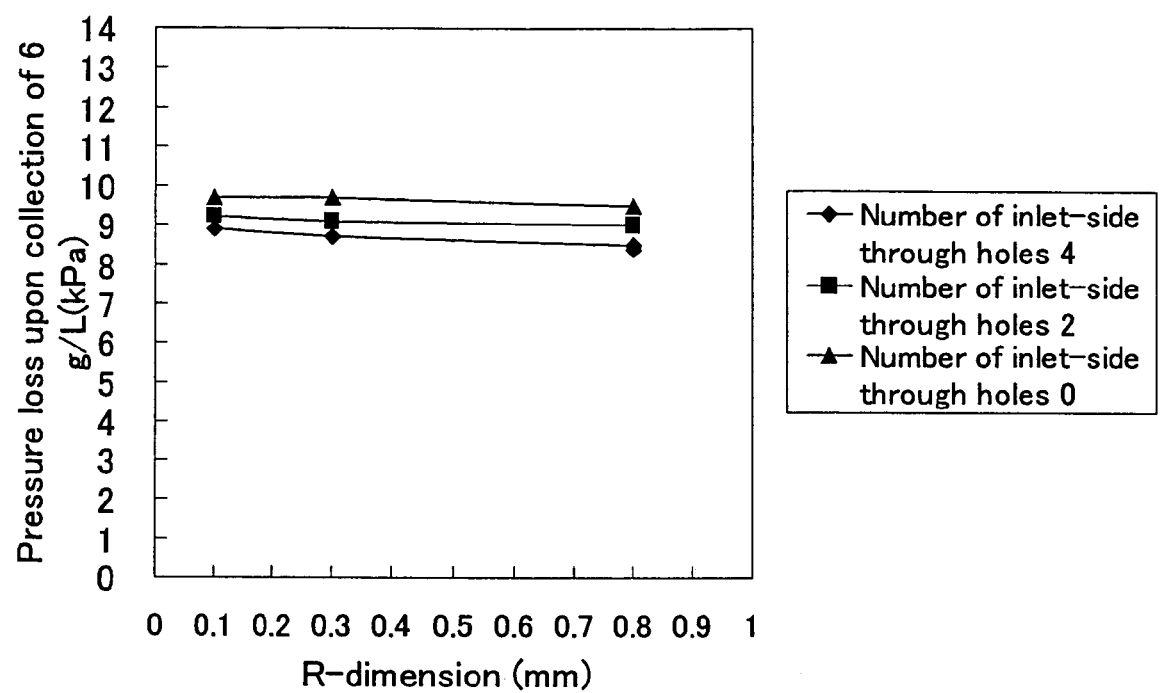
FIG. 19 is a graph which relates to an aggregate-type honeycomb structural body in accordance with Examples 41 to 44 as well as Reference Examples 5, 6, and 29 to 31, and shows the relationship between a C dimension of a C-chamfered face and a pressure loss at the time of collection of 6 g/L.

As shown in FIG. 8, each of aggregate-type honeycomb structural bodies relating to the respective examples, reference examples and comparative examples was installed in an exhaust passage of an engine to form an exhaust gas purifying apparatus, and the engine was driven at the number of revolutions of 3000 min and a torque of 50 Nm for a predetermined period of time and the recovering process was then successively carried out, and the above-mentioned test processes were continuously carried out while the driving time was increased so that the aggregate-type honeycomb structural body was examined for occurrence of any cracks. Then, the amount of particulates that had been collected up to the occurrence of any cracks was determined as a recovery limit value. Here, the recovery limit value of each of the respective examples, reference examples and comparative examples was obtained as an average value of measured values obtained with respect to five aggregate-type honeycomb structural bodies of each of the cases. The results of the tests are shown in the following Tables 1 to 3 and FIGS. 11 to 13.

(2) Variation in pressure loss

As shown in FIG. 8, each of aggregate-type honeycomb structural bodies relating to the respective examples, reference examples and comparative examples was installed in an exhaust passage of an engine to form an exhaust gas purifying apparatus, and the engine was driven at the number of revolutions of 3000 $min^{-1}$ and a torque of 50 Nm for 100 minutes; thus, measurements were carried out with respect to the relationship between the amount of collection of particulates and the pressure loss. With respect to the initial pressure loss and the pressure loss upon collection of particulates of 6 g/L, corresponding data are shown in the following Tables 1 to 3 as well as FIGS. 14 to 19.

TABLE 1

|  | Cross-sectional shape of through hole | Aperture ratio | Chamfered face on circumferential face | R-dimension or C-dimension (mm) | Number of through holes (units) at four corners on inlet side | Recovery limit value (g/L) | Initial pressure loss (kPa) | Pressure loss upon collection of 6 g/L (kPa) |
|---|---|---|---|---|---|---|---|---|
| Example 1 | FIG. 5(b) | 2.54 | R | 0.3 | 4 | 9.2 | 1.6 | 8.7 |
| Example 2 | FIG. 5(b) | 2.54 | R | 0.4 | 4 | 9.3 | 1.6 | 8.5 |
| Example 3 | FIG. 5(b) | 2.54 | R | 0.6 | 4 | 9.3 | 1.5 | 8.4 |
| Example 4 | FIG. 5(b) | 2.54 | R | 0.8 | 4 | 9.5 | 1.4 | 8.3 |
| Example 5 | FIG. 5(b) | 2.54 | R | 0.3 | 2 | 8.3 | 1.8 | 9.0 |

TABLE 1-continued

Figure 10:
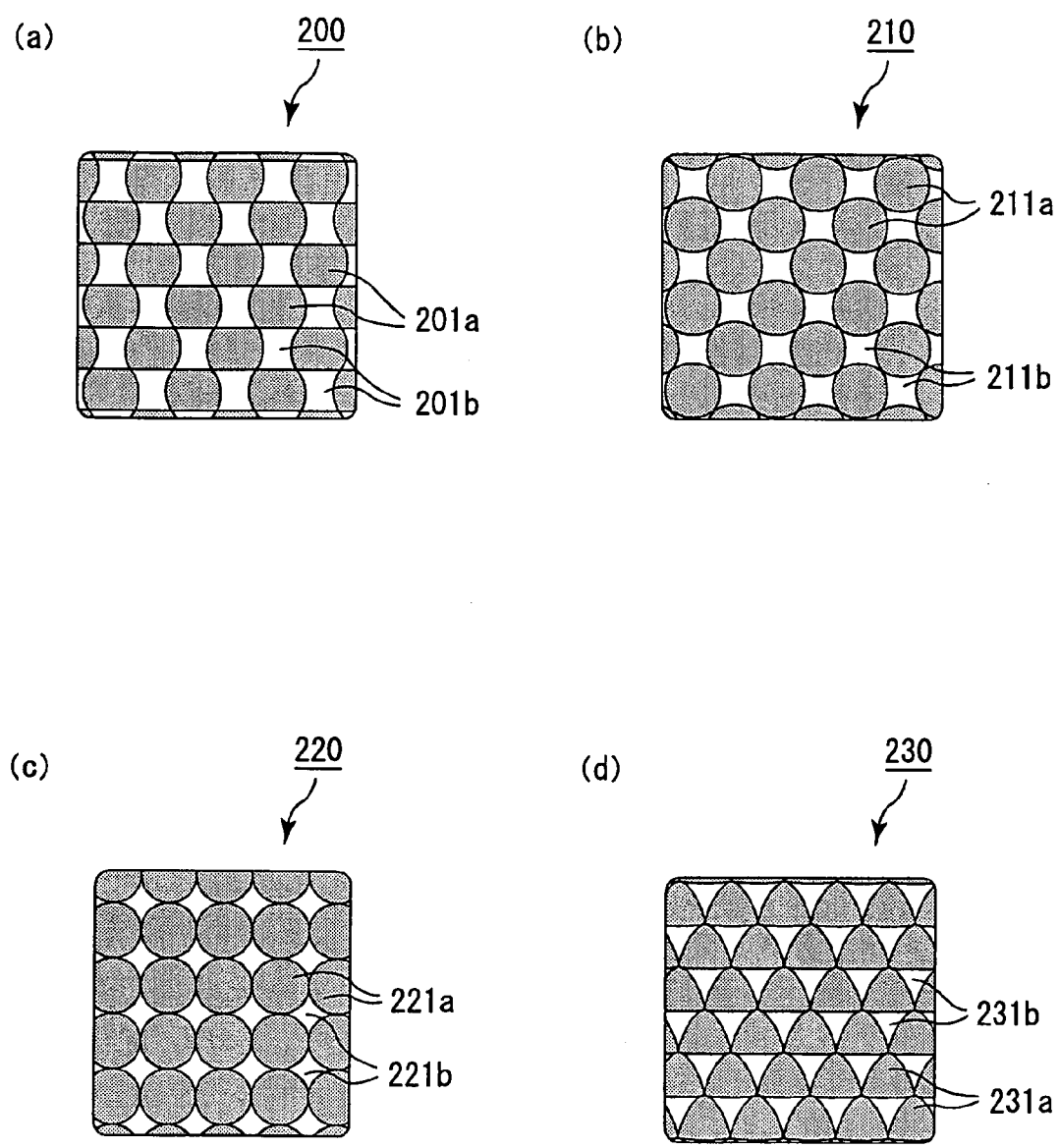
FIGS. 10(a) to 10(d) are cross-sectional views each of which schematically shows an example of a part of a cross section perpendicular to the length direction in the integrated honeycomb structural body of the present invention.

| | Cross-sectional shape of through hole | Aperture ratio | Chamfered face on circumferential face | R-dimension or C-dimension (mm) | Number of through holes (units) at four corners on inlet side | Recovery limit value (g/L) | Initial pressure loss (kPa) | Pressure loss upon collection of 6 g/L (kPa) |
|---|---|---|---|---|---|---|---|---|
| Example 6 | FIG. 5(b) | 2.54 | R | 0.4 | 2 | 8.5 | 1.7 | 9.0 |
| Example 7 | FIG. 5(b) | 2.54 | R | 0.6 | 2 | 8.6 | 1.7 | 8.9 |
| Example 8 | FIG. 5(b) | 2.54 | R | 0.8 | 2 | 8.7 | 1.7 | 8.9 |
| Example 9 | FIG. 6(a) | 4.45 | R | 0.3 | 4 | 8.3 | 2.3 | 9.7 |
| Example 10 | FIG. 6(b) | 6.00 | R | 0.3 | 4 | 8.2 | 2.8 | 10.3 |
| Example 11 | FIG. 6(c) | 4.45 | R | 0.3 | 4 | 8.3 | 2.0 | 10.1 |
| Example 12 | FIG. 6(d) | 6.00 | R | 0.3 | 4 | 8.1 | 2.2 | 10.0 |
| Example 13 | FIG. 6(e) | 4.45 | R | 0.3 | 4 | 8.5 | 2.3 | 9.5 |
| Example 14 | FIG. 6(f) | 6.00 | R | 0.3 | 4 | 8.2 | 2.4 | 10.2 |
| Example 15 | FIG. 4 | 3.00 | R | 0.3 | 4 | 7.7 | 3.2 | 11.7 |
| Example 16 | FIG. 5(a) | 1.55 | R | 0.3 | 4 | 8.4 | 1.6 | 9.1 |
| Example 17 | FIG. 5(c) | 4.45 | R | 0.3 | 4 | 8.6 | 2.1 | 9.3 |
| Example 18 | FIG. 5(d) | 6.00 | R | 0.3 | 4 | 8.3 | 2.5 | 10.1 |
| Example 19 | FIG. 9 | 4.45 | R | 0.3 | 4 | 7.5 | 3.0 | 11.5 |
| Example 20 | FIG. 10(a) | 1.55 | R | 0.3 | 4 | 7.7 | 1.6 | 10.9 |
| Example 21 | FIG. 10(b) | 2.54 | R | 0.3 | 4 | 7.7 | 1.7 | 10.7 |
| Example 22 | FIG. 10(c) | 3.66 | R | 0.3 | 4 | 7.3 | 2.0 | 10.5 |
| Example 23 | FIG. 10(d) | 4.37 | R | 0.3 | 4 | 7.5 | 2.0 | 10.5 |
| Example 24 | FIG. 5(b) | 2.54 | R | 0.3 | 4 | 9.3 | 1.7 | 8.6 |
| Example 25 | FIG. 6(a) | 4.45 | R | 0.8 | 4 | 8.5 | 2.2 | 9.7 |
| Example 26 | FIG. 6(b) | 6.00 | R | 0.8 | 4 | 8.3 | 2.6 | 10.2 |
| Example 27 | FIG. 6(c) | 4.45 | R | 0.8 | 4 | 8.6 | 1.9 | 10.0 |
| Example 28 | FIG. 6(d) | 6.00 | R | 0.8 | 4 | 8.3 | 2.1 | 9.8 |
| Example 29 | FIG. 6(e) | 4.45 | R | 0.8 | 4 | 6.6 | 2.1 | 9.4 |
| Example 30 | FIG. 6(f) | 6.00 | R | 0.8 | 4 | 8.4 | 2.4 | 10.0 |
| Example 31 | FIG. 4 | 3.00 | R | 0.8 | 4 | 7.8 | 2.9 | 11.6 |
| Example 32 | FIG. 5(a) | 1.55 | R | 0.8 | 4 | 8.6 | 1.5 | 9.0 |
| Example 33 | FIG. 5(c) | 4.45 | R | 0.8 | 4 | 8.7 | 2.0 | 9.2 |
| Example 34 | FIG. 5(d) | 6.00 | R | 0.8 | 4 | 8.5 | 2.4 | 10.0 |
| Example 35 | FIG. 9 | 4.45 | R | 0.8 | 4 | 7.6 | 2.8 | 11.4 |
| Example 36 | FIG. 10(a) | 1.55 | R | 0.8 | 4 | 7.9 | 1.5 | 10.7 |
| Example 37 | FIG. 10(b) | 2.54 | R | 0.8 | 4 | 7.8 | 1.6 | 10.5 |
| Example 38 | FIG. 10(c) | 3.66 | R | 0.8 | 4 | 7.7 | 1.8 | 10.4 |
| Example 39 | FIG. 10(d) | 4.37 | R | 0.8 | 4 | 7.6 | 1.8 | 10.3 |
| Example 40 | FIG. 5(b) | 2.54 | R | 0.8 | 4 | 9.5 | 1.5 | 8.5 |
| Example 41 | FIG. 5(b) | 2.54 | C | 0.3 | 4 | 9.4 | 1.6 | 8.7 |
| Example 42 | FIG. 5(b) | 2.54 | C | 0.3 | 2 | 8.3 | 1.9 | 9.1 |
| Example 43 | FIG. 5(b) | 2.54 | C | 0.8 | 4 | 9.4 | 1.4 | 8.4 |
| Example 44 | FIG. 5(b) | 2.54 | C | 0.8 | 2 | 8.6 | 1.7 | 9.0 |

TABLE 2

| | Cross-sectional shape of through hole | Aperture ratio | Chamfered face on circumferential face | R-dimension or C-dimension (mm) | Number of through holes (units) at four corners on inlet side | Recovery limit value (g/L) | Initial pressure loss (kPa) | Pressure loss upon collection of 6 g/L (kPa) |
|---|---|---|---|---|---|---|---|---|
| Reference Example 1 | FIG. 5(b) | 2.54 | R | 0.3 | 0 | 7.0 | 2.0 | 9.6 |
| Reference Example 2 | FIG. 5(b) | 2.54 | R | 0.4 | 0 | 7.2 | 2.0 | 9.5 |
| Reference Example 3 | FIG. 5(b) | 2.54 | R | 0.6 | 0 | 7.3 | 2.0 | 9.5 |
| Reference Example 4 | FIG. 5(b) | 2.54 | R | 0.8 | 0 | 7.5 | 1.9 | 9.4 |
| Reference Example 5 | FIG. 5(b) | 2.54 | C | 0.3 | 0 | 7.4 | 2.1 | 9.7 |
| Reference Example 6 | FIG. 5(b) | 2.54 | C | 0.8 | 0 | 7.3 | 1.9 | 9.5 |
| Reference Example 7 | FIG. 5(b) | 2.54 | R | 0.1 | 4 | 7.3 | 1.7 | 8.8 |
| Reference Example 8 | FIG. 5(b) | 2.54 | R | 0.2 | 4 | 8.5 | 1.7 | 8.7 |
| Reference Example 9 | FIG. 5(b) | 2.54 | R | 0.1 | 2 | 5.1 | 1.8 | 9.1 |

TABLE 2-continued

| | Cross-sectional shape of through hole | Aperture ratio | Chamfered face on circumferential face | R-dimension or C-dimension (mm) | Number of through holes (units) at four corners on inlet side | Recovery limit value (g/L) | Initial pressure loss (kPa) | Pressure loss upon collection of 6 g/L (kPa) |
|---|---|---|---|---|---|---|---|---|
| Reference Example 10 | FIG. 5(b) | 2.54 | R | 0.2 | 2 | 6.6 | 1.8 | 9.1 |
| Reference Example 11 | FIG. 5(b) | 2.54 | R | 0.1 | 0 | 4.8 | 2.1 | 9.7 |
| Reference Example 12 | FIG. 5(b) | 2.54 | R | 0.2 | 0 | 5.8 | 2.0 | 9.6 |
| Reference Example 13 | FIG. 6(a) | 4.45 | R | 0.1 | 4 | 6.3 | 2.4 | 9.9 |
| Reference Example 14 | FIG. 6(b) | 6.00 | R | 0.1 | 4 | 6.1 | 2.8 | 10.5 |
| Reference Example 15 | FIG. 6(c) | 4.45 | R | 0.1 | 4 | 6.2 | 2.1 | 10.2 |
| Reference Example 16 | FIG. 6(d) | 6.00 | R | 0.1 | 4 | 6.1 | 2.4 | 10.0 |
| Reference Example 17 | FIG. 6(e) | 4.45 | R | 0.1 | 4 | 6.8 | 2.3 | 9.7 |
| Reference Example 18 | FIG. 6(f) | 6.00 | R | 0.1 | 4 | 6.3 | 2.7 | 10.2 |
| Reference Example 19 | FIG. 4 | 3.00 | R | 0.1 | 4 | 5.7 | 3.1 | 11.9 |
| Reference Example 20 | FIG. 5(a) | 1.55 | R | 0.1 | 4 | 6.4 | 1.7 | 9.3 |
| Reference Example 21 | FIG. 5(c) | 4.45 | R | 0.1 | 4 | 6.5 | 2.5 | 9.5 |
| Reference Example 22 | FIG. 5(d) | 6.00 | R | 0.1 | 4 | 6.3 | 2.6 | 10.2 |
| Reference Example 23 | FIG. 9 | 4.55 | R | 0.1 | 4 | 5.4 | 3.0 | 11.7 |
| Reference Example 24 | FIG. 10(a) | 1.55 | R | 0.1 | 4 | 5.6 | 1.8 | 11.0 |
| Reference Example 25 | FIG. 10(b) | 2.54 | R | 0.1 | 4 | 5.5 | 1.9 | 10.7 |
| Reference Example 26 | FIG. 10(c) | 3.66 | R | 0.1 | 4 | 5.0 | 2.0 | 10.7 |
| Reference Example 27 | FIG. 10(d) | 4.37 | R | 0.1 | 4 | 5.4 | 2.1 | 10.6 |
| Reference Example 28 | FIG. 5(b) | 2.54 | R | 0.1 | 4 | 7.0 | 1.6 | 8.8 |
| Reference Example 29 | FIG. 5(b) | 2.54 | C | 0.1 | 4 | 7.4 | 1.7 | 8.9 |
| Reference Example 30 | FIG. 5(b) | 2.54 | C | 0.1 | 2 | 4.9 | 1.8 | 9.2 |
| Reference Example 31 | FIG. 5(b) | 2.54 | C | 0.1 | 0 | 4.7 | 2.1 | 9.7 |
| Reference Example 32 | FIG. 5(a) | 1.55 | R | 5.5 | 4 | 8.0 | 1.3 | 8.8 |
| Reference Example 33 | FIG. 5(b) | 2.54 | R | 5.5 | 4 | 8.9 | 1.2 | 8.0 |
| Reference Example 34 | FIG. 5(c) | 4.45 | R | 5.5 | 4 | 8.1 | 1.8 | 8.9 |
| Reference Example 35 | FIG. 5(d) | 6.00 | R | 5.5 | 4 | 7.9 | 2.2 | 9.8 |
| Reference Example 36 | FIG. 6(a) | 4.45 | R | 5.5 | 4 | 7.8 | 2.0 | 9.5 |
| Reference Example 37 | FIG. 6(b) | 6.00 | R | 5.5 | 4 | 7.4 | 2.4 | 9.9 |
| Reference Example 38 | FIG. 6(c) | 4.45 | R | 5.5 | 4 | 7.6 | 1.7 | 9.7 |
| Reference Example 39 | FIG. 6(d) | 6.00 | R | 5.5 | 4 | 7.5 | 1.8 | 9.6 |
| Reference Example 40 | FIG. 6(e) | 4.45 | R | 5.5 | 4 | 8.0 | 1.8 | 9.2 |
| Reference Example 41 | FIG. 6(f) | 6.00 | R | 5.5 | 4 | 7.7 | 2.0 | 9.8 |
| Reference Example 42 | FIG. 4 | 3.00 | R | 5.5 | 4 | 7.2 | 2.7 | 11.4 |
| Reference Example 43 | FIG. 9 | 4.45 | R | 5.5 | 4 | 6.8 | 2.6 | 11.2 |
| Reference Example 44 | FIG. 10(a) | 1.55 | R | 5.5 | 4 | 7.2 | 1.3 | 10.5 |

TABLE 2-continued

|  | Cross-sectional shape of through hole | Aperture ratio | Chamfered face on circumferential face | R-dimension or C-dimension (mm) | Number of through holes (units) at four corners on inlet side | Recovery limit value (g/L) | Initial pressure loss (kPa) | Pressure loss upon collection of 6 g/L (kPa) |
|---|---|---|---|---|---|---|---|---|
| Reference Example 45 | FIG. 10(b) | 2.54 | R | 5.5 | 4 | 8.1 | 1.4 | 10.2 |
| Reference Example 46 | FIG. 10(c) | 3.66 | R | 5.5 | 4 | 6.8 | 1.6 | 10.2 |
| Reference Example 47 | FIG. 10(d) | 4.37 | R | 5.5 | 4 | 6.9 | 1.5 | 10.0 |

TABLE 3

|  | Cross-sectional shape of through hole | Aperture ratio | Chamfered face on circumferential face | Number of through holes (units) at four corners on inlet side | Recovery limit value (g/L) | Initial pressure loss (kPa) | Pressure loss upon collection of 6 g/L (kPa) |
|---|---|---|---|---|---|---|---|
| Comparative Example 1 | FIG. 5(a) | 1.55 | NO | 4 | 4.0 | 1.7 | 9.3 |
| Comparative Example 2 | FIG. 5(b) | 2.54 | NO | 4 | 4.9 | 1.7 | 8.8 |
| Comparative Example 3 | FIG. 5(c) | 4.45 | NO | 4 | 4.1 | 2.5 | 9.5 |
| Comparative Example 4 | FIG. 5(d) | 6.00 | NO | 4 | 3.9 | 2.6 | 10.2 |
| Comparative Example 5 | FIG. 6(a) | 4.45 | NO | 4 | 3.8 | 2.4 | 9.9 |
| Comparative Example 6 | FIG. 6(b) | 6.00 | NO | 4 | 3.4 | 2.8 | 10.5 |
| Comparative Example 7 | FIG. 6(c) | 4.45 | NO | 4 | 3.6 | 2.1 | 10.2 |
| Comparative Example 8 | FIG. 6(d) | 6.00 | NO | 4 | 3.6 | 2.4 | 10.0 |
| Comparative Example 9 | FIG. 6(e) | 4.45 | NO | 4 | 4.0 | 2.3 | 9.7 |
| Comparative Example 10 | FIG. 6(f) | 6.00 | NO | 4 | 3.7 | 2.7 | 10.2 |
| Comparative Example 11 | FIG. 4 | 3.00 | NO | 4 | 3.2 | 3.1 | 11.9 |
| Comparative Example 12 | FIG. 9 | 4.45 | NO | 4 | 3.0 | 3.0 | 11.7 |
| Comparative Example 13 | FIG. 10(a) | 1.55 | NO | 4 | 3.2 | 1.8 | 11.0 |
| Comparative Example 14 | FIG. 10(b) | 2.54 | NO | 4 | 3.1 | 1.9 | 10.7 |
| Comparative Example 15 | FIG. 10(c) | 3.66 | NO | 4 | 2.4 | 2.0 | 10.7 |
| Comparative Example 16 | FIG. 10(d) | 4.37 | NO | 4 | 2.9 | 2.1 | 10.6 |
| Comparative Example 17 | FIG. 5(e) | 1.00 | NO | 4 | 7.8 | 1.5 | 12.0 |

As clearly indicated by the results shown in Tables 1 to 3 and FIGS. 11 to 19, with respect to the aggregate-type honeycomb structural bodies having mutually the same number of through holes at four corners on the inlet side and the aggregate-type honeycomb structural bodies having mutually the same shape at the cross-sectional shape perpendicular to the length direction, those having chamfered faces were improved in the recovery limit value thereof, and became less likely to produce cracks. In particular, when the dimension was set from 0.3 mm or more to less than 5.5 mm, a favorably recovery limit value was obtained.

Moreover, in the case where the numbers of inlet-side through holes are the same, even if cross-sectional shapes perpendicular to the length direction are different, the relationships between the R-dimension of R-chamfered faces and the recovery limit value as well as between the C-dimension of C-chamfered faces and the recovery limit value were approximately the same.

Furthermore, the greater the number of inlet-side through holes at the four corners, the greater the effects for reducing the pressure loss.

INDUSTRIAL APPLICABILITY

The honeycomb structural body of the present invention has a low pressure loss upon collecting particulates, makes it possible to deposit a great amount of particulates and ashes, and is less likely to generate cracks; therefore, the honeycomb structural body is applicable as a filter for an exhaust gas purifying apparatus for use in vehicles.

The invention claimed is:

1. An aggregated-type honeycomb structural body comprising:
   a plurality of honeycomb structural bodies bounded with one another, the honeycomb structural bodies each having a plurality of large-capacity through holes and a plurality of small-capacity through holes extending in parallel in a length direction and having a polygonal shape and a chamfered corner portion in a cross section perpendicular to the length direction,
   wherein the large-capacity through holes are sealed at one end of the plurality of honeycomb structural bodies, the small-capacity through holes are sealed at the other end of the plurality of honeycomb structural bodies, and the large-capacity through holes have a total cross-section area which is larger than a total cross-section area of the small-capacity through holes.

2. An aggregated-type honeycomb structural body comprising:
   a plurality of honeycomb structural bodies bounded with one another, the honeycomb structural bodies each having a plurality of large-capacity through holes and a plurality of small-capacity through holes extending in parallel in a length direction and having a polygonal shape and a first chamfered corner portion in a cross section perpendicular to the length direction,
   wherein the large-capacity through holes are sealed at one end of the plurality of honeycomb structural bodies, the small-capacity through holes are sealed at the other end of the plurality of honeycomb structural bodies, and the large-capacity through holes has a total cross-section area which is larger than a total cross-section area of the small-capacity structural bodies, and
   the honeycomb structural bodies each have a through hole located adjacent to the first chamfered corner portion, the through hole having in the cross-section a second chamfered corner portion corresponding to the first chamfered corner portion of the respective honeycomb structural body.

3. The aggregated-type honeycomb structural body according to claim 1, wherein the large-capacity through holes and the small-capacity through holes include ones adjacent to the chamfered corner portions, at least a half of the ones adjacent to the chamfered corner portions being ones of the large-capacity through holes.

4. The aggregated-type honeycomb structural body according to claim 3, wherein the ones adjacent to the chamfered corner portions are ones of the large-capacity through holes.

5. The aggregated-type honeycomb structural body according to claim 1, wherein the large-capacity through holes and/or the small-capacity through holes have a polygonal shape in the cross-section.

6. The aggregated-type honeycomb structural body according to claim 1, wherein, in the cross-section, at least one angle formed at a point where a first wall portion, shared by a through hole constituting a group of large-capacity through holes and an adjacent through hole constituting a group of large-capacity through holes, intersects a second wall portion, shared by a through hole constituting a group of the large-capacity through holes and an adjacent through hole constituting a group of the small-capacity through holes, is an obtuse angle.

7. The aggregated-type honeycomb structural body according to claim 1, wherein one group of the large-capacity through holes and the small-capacity through holes has an octagonal shape in the cross-section and the other group of the large-capacity through holes and the small-capacity through holes has a quadrangle or square shape in the cross-section.

8. The aggregated-type honeycomb structural body according to claim 1, wherein in the cross-section, the large-capacity through holes and/or the small-capacity through holes have chamfered corner portions.

9. The agggregated-type honeycomb structural body according to claim 1, wherein a distance between centers of gravity in the cross-section of the nearest large-capacity through holes is same as a distance between centers of gravity in the cross-section of the nearest small-capacity through holes.

10. A filter for an exhaust gas purifying apparatus for a vehicle, comprising:
    an aggregate-type honeycomb structural body comprising a plurality of honeycomb structural bodies bounded one another, the honeycomb structural bodies each having a plurality of large-capacity through holes and a plurality of small-capacity through holes extending in parallel in a length direction and having a chamfered corner portion in a cross section perpendicular to the length direction,
    wherein the large-capacity through holes are sealed at one end of the plurality of honeycomb structural bodies, the small-capacity through holes are sealed at the other end of the plurality of honeycomb structural bodies, and the large-capacity through holes have a total cross-section area which is larger than a total cross-section area of the small-capacity through holes.

11. The aggregated-type honeycomb structural body according to claim 2, wherein the large-capacity through holes and the small-capacity through holes include ones adjacent to the first chamfered corner portions, at least a half of the ones adjacent to the first chamfered corner portions being ones of the large-capacity through holes.

12. The aggregated-type honeycomb structural body according to claim 11, wherein the ones adjacent to the first chamfered corner portions are ones of the large-capacity through holes.

13. The aggregated-type honeycomb structural body according to claim 2, wherein the large-capacity through holes and/or the small-capacity through holes have a polygonal shape in the cross-section.

14. The aggregated-type honeycomb structural body according to claim 2, wherein, in the cross-section, at least one angle formed at a point where a first wall portion, shared by a through hole constituting a group of large-capacity through holes and an adjacent through hole constituting a group of large-capacity through holes, intersects a second wall portion, shared by a through hole constituting a group of the large-capacity through holes and an adjacent through hole constituting a group of the small-capacity through holes, is an obtuse angle.

15. The aggregated-type honeycomb structural body according to claim 2, wherein one group of the large-capacity through holes and the small-capacity through holes has an octagonal shape in the cross-section and the other group of the large-capacity through holes and the small-capacity through holes has a quadrangle or square shape in the cross-section.

16. The aggregated-type honeycomb structural body according to claim 1, wherein in the cross-section, the large-capacity through holes and/or the small-capacity through holes have chamfered corner portions.

17. The aggregated-type honeycomb structural body according to claim 2, wherein a distance between centers of gravity in the cross-section of the nearest large-capacity through holes is same as a distance between centers of gravity in the cross-section of the nearest small-capacity through holes.

18. A filter for an exhaust gas purifying apparatus for a vehicle, comprising:
   an aggregate-type honeycomb structural body comprising a plurality of honeycomb structural bodies bounded with one another, the honeycomb structural bodies each having a plurality of large-capacity through holes and a plurality of small-capacity through holes extending in parallel in a length direction and having a polygonal shape and a first chamfered corner portion in a cross section perpendicular to the length direction,
   wherein the large-capacity through holes are sealed at one end of the plurality of honeycomb structural bodies, the small-capacity through holes are sealed at the other end of the plurality of honeycomb structural bodies, and the large-capacity through holes have a total cross-section area which is larger than a total cross-section area of the small-capacity through holes, and
   the honeycomb structural bodies each have a through hole located adjacent to the first chamfered corner portion, the through hole having in the cross-section a second chamfered corner portion corresponding to the first chamfered corner portion of the respective honeycomb structural body.

19. The aggregated-type honeycomb structural body according to claim 1, wherein the chamfered corner portion comprises one of a R-chamfered shape and a C-chamfered shape.

20. The aggregated-type honeycomb structural body according to claim 2, wherein the second chamfered corner portion comprises one of a R-chamfered shape and a C-chamfered shape.

21. The aggregated-type honeycomb structural body according to claim 1, further comprising a sealing material binding the honeycomb structural bodies.

22. The aggregated-type honeycomb structural body according to claim 2, further comprising a sealing material binding the honeycomb structural bodies.

23. The aggregated-type honeycomb structural body according to claim 21, wherein the sealing material comprises at least one binder selected from the group consisting of an inorganic binder and an organic binder.

24. The aggregated-type honeycomb structural body according to claim 22, wherein the sealing material comprises at least one binder selected from the group consisting of an inorganic binder and an organic binder.

25. The aggregated-type honeycomb structural body according to claim 1, wherein the large-capacity and small-capacity through holes are alternately formed in each of the honeycomb structural bodies.

26. The aggregated-type honeycomb structural body according to claim 2, wherein the large-capacity and small-capacity through holes are alternately formed in each of the honeycomb structural bodies.

* * * * *